United States Patent
Nogami et al.

(10) Patent No.: US 9,832,001 B2
(45) Date of Patent: Nov. 28, 2017

(54) TERMINAL DEVICE, BASE STATION, COMMUNICATION SYSTEM, AND COMMUNICATION METHOD

(71) Applicant: Sharp Kabushiki Kaisha, Osaka-shi, Osaka (JP)

(72) Inventors: Toshizo Nogami, Osaka (JP); Tatsushi Aiba, Osaka (JP); Shoichi Suzuki, Osaka (JP); Kazuyuki Shimezawa, Osaka (JP); Kimihiko Imamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 11 days.

(21) Appl. No.: 14/897,260

(22) PCT Filed: Jun. 21, 2013

(86) PCT No.: PCT/JP2013/067074
§ 371 (c)(1),
(2) Date: Dec. 10, 2015

(87) PCT Pub. No.: WO2014/203392
PCT Pub. Date: Dec. 24, 2014

(65) Prior Publication Data
US 2016/0127106 A1 May 5, 2016

(51) Int. Cl.
*H04L 5/00* (2006.01)
*H04W 72/04* (2009.01)

(52) U.S. Cl.
CPC .......... *H04L 5/0096* (2013.01); *H04L 5/0053* (2013.01); *H04W 72/042* (2013.01);
(Continued)

(58) Field of Classification Search
CPC ... H04L 5/0096; H04L 5/0053; H04L 5/0055; H04L 5/001; H04L 5/0048; H04W 72/042; H04W 72/0413
See application file for complete search history.

(56) References Cited

U.S. PATENT DOCUMENTS 8,989,118 B2 * 3/2015 He .................... H04W 28/0268
370/329
2009/0310549 A1 * 12/2009 Higuchi ................ H04L 1/0028
370/329

(Continued)

FOREIGN PATENT DOCUMENTS

JP       2013-026877 A       2/2013

OTHER PUBLICATIONS

Official Communication issued in International Patent Application No. PCT/JP2013/067074, dated Jul. 16, 2011.
(Continued)

*Primary Examiner* — Jamal Javaid
(74) *Attorney, Agent, or Firm* — Keating & Bennett, LLP

(57) ABSTRACT

The present invention provides a base station, a terminal device, a communication system, and a communication method configured to efficiently specify a physical uplink control channel resource in a case that the base station notifies the terminal device of control information through an enhanced physical downlink control channel or in a case that a cell radius is small. The terminal device in communication with the base station monitors a physical downlink control channel placed in a common search space and an enhanced physical downlink control channel placed in a terminal-specific search space. Upon detecting the enhanced physical downlink control channel, the terminal device maps response information to a physical uplink control channel resource determined in response to at least an index of an element forming the detected enhanced physical downlink
(Continued)

control channel and an individual shift amount individually configured on a per terminal device basis, and then reports the base station of the mapped response information.

12 Claims, 21 Drawing Sheets

(52) U.S. Cl.
CPC ......... *H04W 72/0413* (2013.01); *H04L 5/001* (2013.01); *H04L 5/0023* (2013.01); *H04W 72/04* (2013.01)

(56) References Cited

U.S. PATENT DOCUMENTS

| | | | |
|---|---|---|---|
| 2011/0038275 A1* | 2/2011 | Kim | H04W 48/16 370/252 |
| 2011/0287797 A1* | 11/2011 | Iwai | H04L 5/0048 455/509 |
| 2014/0133452 A1 | 5/2014 | Nogami et al. | |

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.2.0, Jun. 2011, pp. 1-103.

"3rd Generation Partnership Project; Technical Specification Group Radio Access Network; Evolved Universal Terrestrial Radio Access (E-UTRA); Physical layer procedures (Release 11)," 3GPP TS 36.213 V11.2.0, Feb. 2013, pp. 1-173.

"3rd Generation Partnership Project; Technical Specification Group Radio Access Network; Evolved Universal Terrestrial Radio Access (E-UTRA); Physical layer procedures (Release 10)," 3GPP TS 36.213 V10.2.0, Jun. 2011, pp. 1-120.

* cited by examiner

FIG. 7

UPLINK CONTROL CHANNEL LOGIC RESOURCE

| $n_{PUCCH}$ | ORTHOGONAL CODE | CYCLIC SHIFT | m |
|---|---|---|---|
| 0 | OC0 | CS0 | $N_{F2}$ |
| 1 | OC1 | CS0 | $N_{F2}$ |
| 2 | OC2 | CS0 | $N_{F2}$ |
| 3 | OC0 | CS2 | $N_{F2}$ |
| 4 | OC1 | CS2 | $N_{F2}$ |
| 5 | OC2 | CS2 | $N_{F2}$ |
| ⋮ | ⋮ | ⋮ | ⋮ |
| 15 | OC0 | CS10 | $N_{F2}$ |
| 16 | OC1 | CS10 | $N_{F2}$ |
| 17 | OC2 | CS10 | $N_{F2}$ |
| 18 | OC0 | CS0 | $N_{F2}+1$ |
| 19 | OC1 | CS0 | $N_{F2}+1$ |
| 20 | OC2 | CS0 | $N_{F2}+1$ |
| ⋮ | ⋮ | ⋮ | ⋮ |

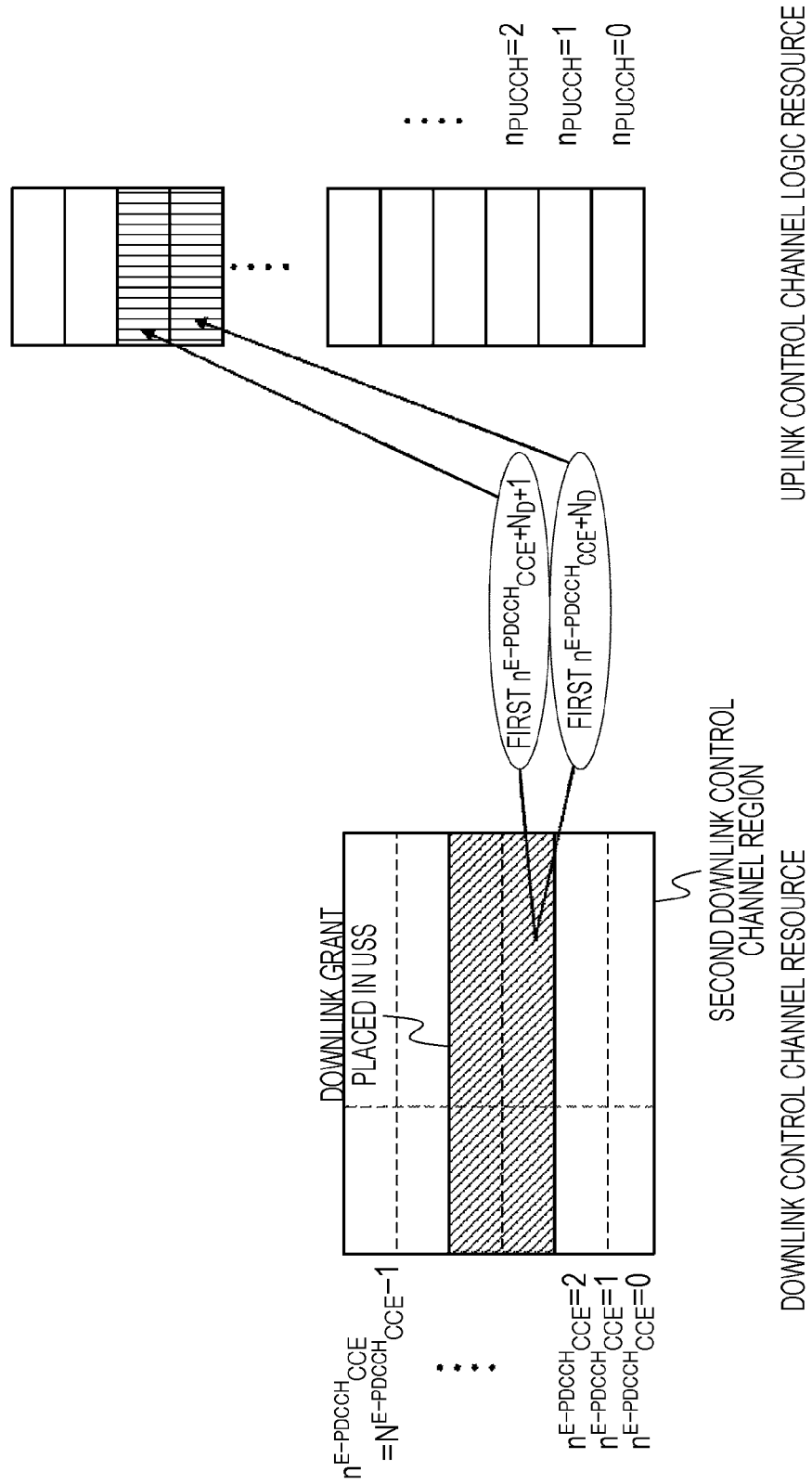

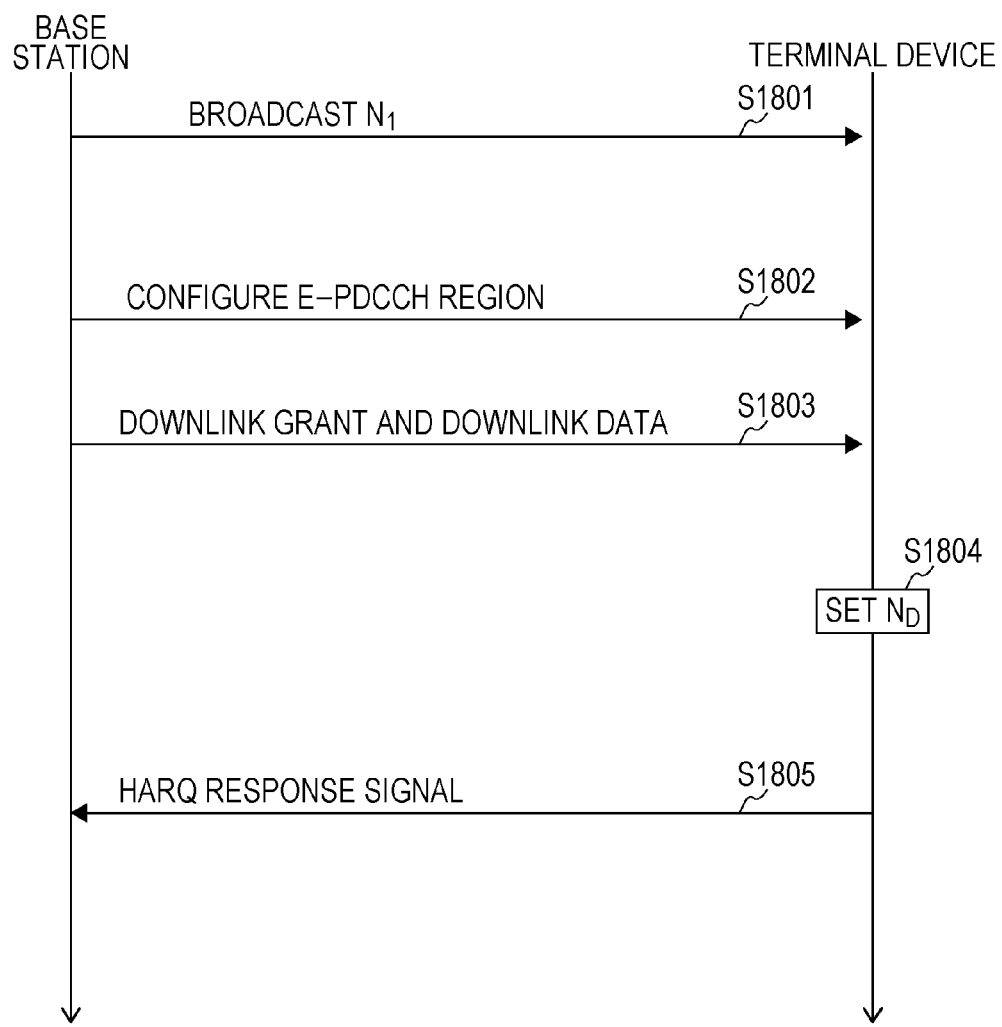

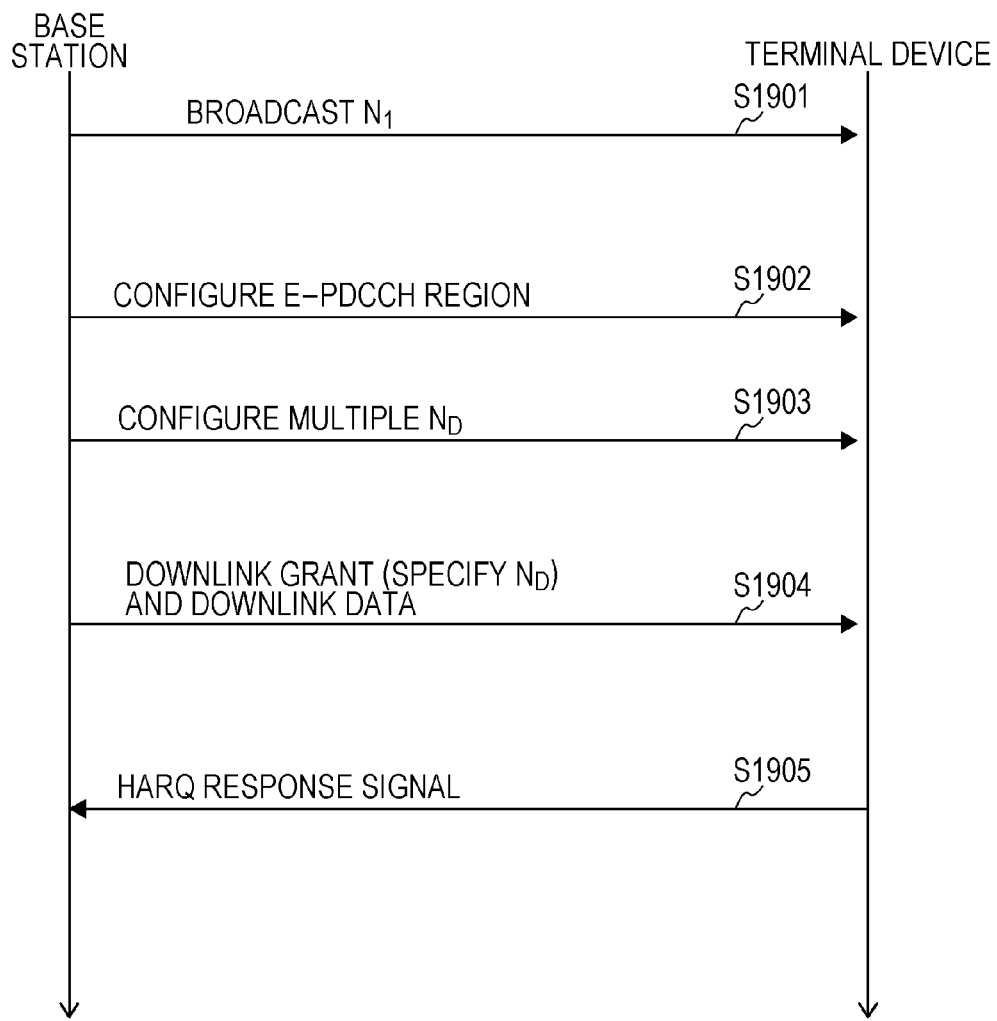

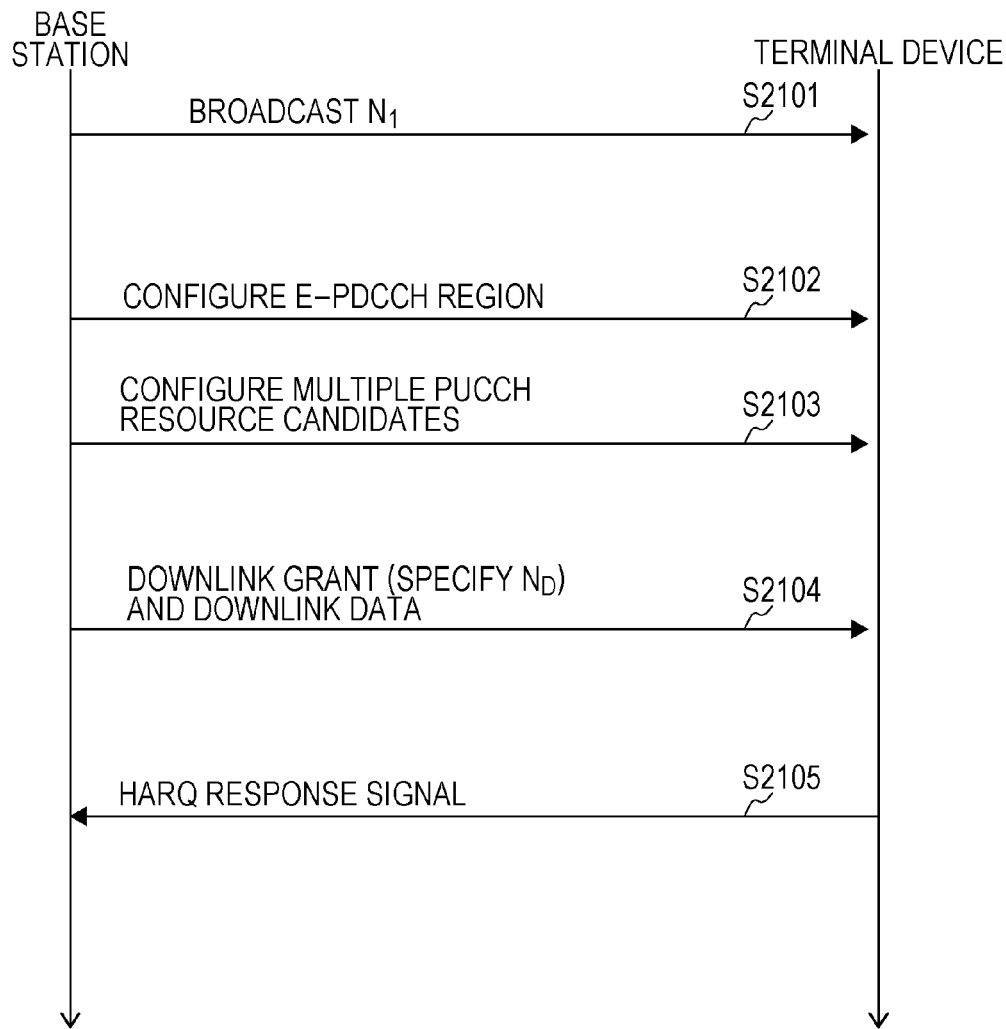

TERMINAL DEVICE, BASE STATION, COMMUNICATION SYSTEM, AND COMMUNICATION METHOD

TECHNICAL FIELD

The present invention relates to a terminal device, a base station, a communication system, and a communication method.

BACKGROUND ART

In radio communication systems such as LTE (Long Term Evolution), and LTE-A (LTE-Advanced) by 3GPP (Third Generation Partnership Project), and Wireless LAN, and WiMAX (Worldwide Interoperability for Microwave Access) by IEEE (The Institute of Electrical and Electronics engineers), each of the base stations (base station apparatus, downlink transmitting apparatus, uplink receiving apparatus, eNodeB) and the terminals (terminal device, mobile station apparatus, downlink receiving apparatus, uplink transmitting apparatus, and UE) respectively include multiple transmit and receive antennas and are configured to employ MIMO (Multi Input and Multi Output) technique to spatial-multiplex data signals, and perform high-speed data communication. In particular, in LTE, and LTE-A, a high frequency utilization efficiency is achieved using OFDM (Orthogonal Frequency Division Multiplexing) system in the downlink while peak power is cut down on using SC-FDMA (Single Carrier-Frequency Division Multiple Access) system in the uplink. Furthermore, HARQ (Hybrid ARQ) as a combination of automatic repeat request ARQ and error-correction coding is adopted.

FIG. 23 illustrates a configuration of an LTE communication system that is configured to perform HARQ. Referring to FIG. 23, a base station 2301 notifies a terminal device 2302 of control information related to downlink transmission data 2304 via a physical downlink control channel (PDCCH) 2303. The terminal device 2302 detects the control information. If the control information is detected, the terminal device 2302 extracts the downlink transmission data 2304 using the detected control information. The terminal device 2302 having detected the control information reports, to the base station 2301 via a physical uplink control channel (PUCCH) 2105, HARQ response information indicating whether the extraction of the downlink transmission data 2304 has been successful or not. In this case, the resource of the PUCCH 2305 (PUCCH resource) available for the terminal device 2302 is implicitly/suggestively and uniquely determined from resources of the PDCCH 2303 to which the control information is allocated. In a case the terminal device 2302 reports the HARQ response information, a dynamically allocated PUCCH resource may be used. The PUCCH resource is not duplicated among the terminal devices (Non Patent Literature 1 and Non Patent Literature 2).

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 10), June 2011, 3GPP TS 36.211 V10. 2.0 (2011-06).

NPL 2: 3rd Generation Partnership Project; Technical Specification Group Radio Access Network; Evolved Universal Terrestrial Radio Access (E-UTRA); Physical layer procedures (Release 10), June 2011, 3GPP TS 36.213 V10. 2.0 (2011-06).

SUMMARY OF INVENTION

Technical Problem

It is contemplated that not only the physical downlink control channel but also the enhanced physical downlink control channel is used in the radio communication system performing HARQ since the number of terminal devices accommodated by a single base station increases. It is also contemplated that the physical uplink control channel resource is transmitted to a base station having a smaller cell radius. In the specifying method of the physical uplink control channel resource in the related art, specifying the physical uplink control channel resource between the base station and the terminal device is difficult in a case that the base station transmits the control information through the enhanced physical downlink control channel, and this impedes an increase in the transmission efficiency.

The present invention has been developed in view of the above problem, and relates to a radio communication system where a base station and a terminal device are in communication. It is an object of the present invention to provide a base station, a terminal device, a communication system, and a communication method to efficiently specify a physical uplink control channel resource in a case that the base station notifies the terminal device of control information not only through the physical downlink control channel but also through the enhanced physical downlink control channel or in a case that the physical uplink control channel resource is transmitted to the base station having a smaller cell radius.

Solution to Problem (1) The present invention has been developed to solve the above problem. According one aspect of the present invention, there is provided a terminal device. The terminal device in communication with a base station includes a downlink control channel detecting unit configured to monitor a physical downlink control channel placed in a common search space and an enhanced physical downlink control channel placed in a UE-specific search space, a data extracting unit configured to extract transmission data from a physical downlink shared channel related to the detected physical downlink control channel or the detected enhanced physical downlink control channel, a response information generating unit configured to generate response information responsive to the extracted transmission data, an uplink control channel generating unit, in a case that the downlink control channel detecting unit has detected the enhanced physical downlink control channel, configured to generate a physical uplink control channel by mapping the response information to a physical uplink control channel resource determined in response to at least an index of an element forming the detected enhanced physical downlink control channel and an individual shift amount individually configured on a per terminal device basis, and a response transmitting unit configured to transmit a signal including the physical uplink control channel.

(2) According to another aspect of the present invention, in the terminal device, the uplink control channel generating unit generates the physical uplink control channel by mapping the response information to the physical uplink control channel resource determined by adding at least the individual shift amount to the index of the element forming the detected enhanced physical downlink control channel.

(3) According to another aspect of the present invention, the terminal device includes a higher layer control information acquisition unit configured to acquire control information including a parameter indicating the individual shift amount.

(4) According to another aspect of the present invention, in the terminal device, the higher layer control information acquisition unit is configured to acquire the control information including a parameter indicating a common shift amount commonly configured on terminal devices. If the downlink control channel detecting unit has detected the physical downlink control channel, the uplink control channel generating unit generates the physical uplink control channel by mapping the response information to the physical uplink control channel resource having as an index a value resulting from adding at least the common shift amount to the index of the element forming the detected physical downlink control channel. If the downlink control channel detecting unit has detected the enhanced physical downlink control channel, the uplink control channel generating unit generates the physical uplink control channel by mapping the response information to the physical uplink control channel resource having as an index a value resulting from adding at least the individual shift amount to the index of the element forming the detected enhanced physical downlink control channel.

(5) According to another aspect of the present invention, in the terminal device, the uplink control channel generating unit generates the physical uplink control channel by mapping the response information to the physical uplink control channel resource determined in response to at least the index of the element forming the detected enhanced physical downlink control channel and the individual shift amount configured on a transmission port with the enhanced physical downlink control channel detected therefrom.

(6) According to another aspect of the present invention, in the terminal device, upon detecting the enhanced physical downlink control channel, the downlink control channel detecting unit extracts a single individual shift amount specified by the detected enhanced physical downlink control channel from among a plurality of types of individual shift amounts. In a case that the downlink control channel detecting unit has detected the enhanced physical downlink control channel, the uplink control channel generating unit generates the physical uplink control channel by mapping the response information to the physical uplink control channel resource determined by adding at least the extracted individual shift amount to the index of the element forming the enhanced physical downlink control channel.

(7) According one aspect of the present invention, there is provided a base station in communication with a terminal device. The base station includes a physical control information notifying unit configured to notify the terminal device of a physical downlink control channel placed in a common search space or an enhanced physical downlink control channel placed in a UE-specific search space, and a response information receiving unit, in a case that the physical control information notifying unit notifies the terminal device of the enhanced physical downlink control channel, configured to extract a physical uplink control channel mapped to response information responsive to transmission data in a physical downlink shared channel related to the enhanced physical downlink control channel, in a physical uplink control channel resource determined in response to at least an index of an element forming the enhanced physical downlink control channel and an individual shift amount individually configured on a per terminal device basis.

(8) According to another aspect of the present invention, in the base station, in a case that the physical control information notifying unit notifies the terminal device of the enhanced physical downlink control channel, the response information receiving unit extracts the physical uplink control channel in the physical uplink control channel resource determined by adding at least the individual shift amount to the index of the element forming the enhanced physical downlink control channel.

(9) According to another aspect of the present invention, the base station further includes a higher layer control information notifying unit configured to notify the terminal device of control information including a parameter indicating the individual shift amount.

(10) According to another aspect of the present invention, in the base station, the higher layer control information notifying unit notifies the terminal device of the control information including a parameter indicating a common shift amount commonly configured in terminal devices. If the physical control information notifying unit notifies the terminal device of the physical downlink control channel, the response information receiving unit extracts the physical uplink control channel in the physical uplink control channel resource having as an index a value resulting from adding at least the common shift amount to the index of the element forming the physical downlink control channel. If the physical control information notifying unit notifies the terminal device of the enhanced physical downlink control channel, the response information receiving unit extracts the physical uplink control channel in the physical uplink control channel resource having as an index a value resulting from adding at least the individual shift amount to the index of the element forming the enhanced physical downlink control channel.

(11) According to another aspect of the present invention, in the base station, the response information receiving unit extracts the physical uplink control channel in the physical uplink control channel resource determined in response to at least the index of the element forming the enhanced physical downlink control channel and the individual shift amount configured on a transmission port with the enhanced physical downlink control channel detected therefrom.

(12) According to another aspect of the present invention, in the base station, the physical control information notifying unit notifies the terminal device of the detected enhanced physical downlink control channel specifying a single individual shift amount from among a plurality of types of individual shift amounts. The response information receiving unit extracts the physical uplink control channel in the physical uplink control channel resource determined by adding at least the specified individual shift amount to the index of the element forming the physical downlink control channel.

(13) According to one embodiment of the present invention, there is provided a communication system including a base station and a terminal device in communication with each other. The terminal device includes a downlink control channel detecting unit configured to monitor a physical downlink control channel placed in a common search space and an enhanced physical downlink control channel placed in a UE-specific search space, a data extracting unit configured to extract transmission data from a physical downlink shared channel related to the detected physical downlink control channel or the detected enhanced physical downlink control channel, a response information generating unit configured to generate response information responsive to the extracted transmission data, an uplink control channel generating unit, in a case that the downlink control channel detecting unit has detected the enhanced physical downlink control channel, configured to generate a physical uplink control channel by mapping the response information to a physical uplink control channel resource determined in response to at least an index of an element forming the detected enhanced physical downlink control channel and an individual shift amount individually configured on a per terminal device basis, and a response transmitting unit configured to transmit a signal including the physical uplink control channel. The base station includes a physical control information notifying unit configured to notify the terminal device of the physical downlink control channel placed in the common search space or the enhanced physical downlink control channel placed in the UE-specific search space, and a response information receiving unit configured to extract the physical uplink control channel in the physical uplink control channel resource in a case that the physical control information notifying unit notifies the terminal device of the enhanced physical downlink control channel.

(14) According to one embodiment of the present invention, there is provided a communication method of a terminal device in communication with a base station. The communication method includes a step of monitoring a physical downlink control channel placed in a common search space and an enhanced physical downlink control channel placed in a UE-specific search space, a step of extracting transmission data from a physical downlink shared channel related to the detected physical downlink control channel or the detected enhanced physical downlink control channel, a step of generating response information responsive to the extracted transmission data, a step of generating a physical uplink control channel, with the enhanced physical downlink control channel detected, by mapping the response information to a physical uplink control channel resource determined in response to at least an index of an element forming the detected enhanced physical downlink control channel and an individual shift amount individually configured on a per terminal device basis, and a step of transmitting a signal including the physical uplink control channel.

(15) According to one aspect of the present invention, there is provided a communication method of a base station in communication with a terminal device. The communication method includes a step of notifying the terminal device of a physical downlink control channel placed in a common search space or an enhanced physical downlink control channel placed in a UE-specific search space, and a step of extracting a physical uplink control channel mapped to response information responsive to transmission data in a physical downlink shared channel related to the enhanced physical downlink control channel, with the enhanced physical downlink control channel notified, in a physical uplink control channel resource determined in response to at least an index of an element forming the enhanced physical downlink control channel and an individual shift amount individually configured on a per terminal device basis.

Advantageous Effects of Invention

In the radio communication system of present invention, the base station and the terminal device are in communication with each other. A physical uplink control channel resource is efficiently specified in a case that the base station notifies the terminal device of control information not only through the physical downlink control channel but also through an enhanced physical downlink control channel or in a case that the physical uplink control channel resource is transmitted to the base station having a smaller cell radius.

BRIEF DESCRIPTION OF DRAWINGS

FIG. 7 illustrates an association table indicating an uplink control channel logic resource of the first embodiment.

FIG. 17 illustrates another example of the downlink grant and the PUCCH resource allocation of the first embodiment.

FIG. 18 illustrates a downlink data transmission and the flow of a response procedure between a base station and a terminal device of a second embodiment of the present invention.

FIG. 19 illustrates a downlink data transmission and the flow of a response procedure between a base station and a terminal device of a third embodiment.

FIG. 20 illustrates an association table between indexes and multiple types of shift amounts of the third embodiment of the present invention.

FIG. 21 illustrates a downlink data transmission and the flow of a response procedure between a base station and a terminal device of a fourth embodiment of the present invention.

FIG. 22 illustrates an association table between indexes and multiple types of PUCCH candidates of the fourth embodiment.

DESCRIPTION OF EMBODIMENTS

First Embodiment

A first embodiment of the present invention is described below. A communication system of the first embodiment includes a base station (a base station apparatus, a downlink transmitting apparatus, an uplink receiving apparatus, or eNodeB), and a terminal (a terminal device, a mobile station apparatus, a downlink receiving apparatus, an uplink transmitting apparatus, or UE).

Figure 1:
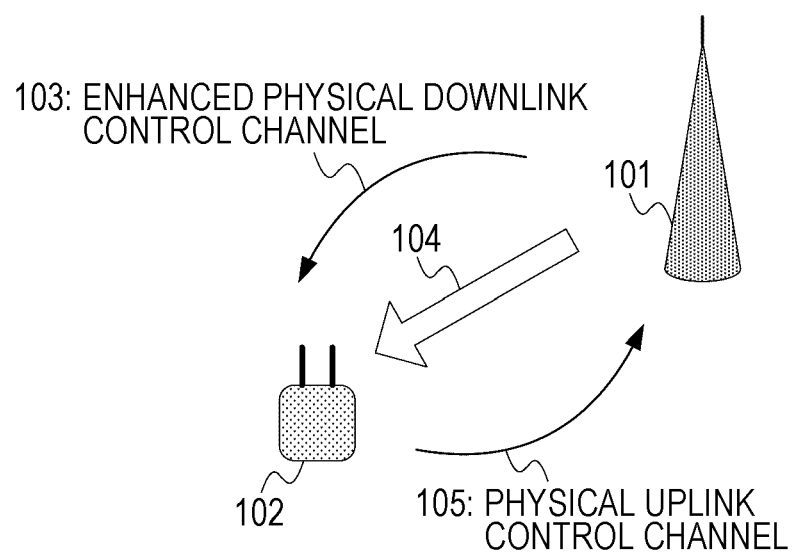
FIG. 1 illustrates a configuration of a communication system of a first embodiment of the present invention.

FIG. 1 illustrates a configuration of a communication system of the first embodiment. Referring to FIG. 1, a base station 101 notifies a terminal device 102 of control information concerning downlink transmission data 104 via PDCCH and/or an enhanced physical downlink control channel (E-PDCCH) 103. The terminal device 102 detects the control information. Upon detecting the control information, the terminal device 102 extracts the downlink transmission data 104 using the detected control information. Upon detecting the control information, the terminal device 102 reports, to the base station 101 via PUCCH, HARQ response information (also referred to as "Ack/Nack" or "HARQ-ACK") indicating whether or not the downlink transmission data 104 has been successfully extracted. In a case that the terminal device 102 detects the control information in the PDCCH, the sources of the physical uplink control channel (PUCCH) 105 available for the terminal device 102 are implicitly/suggestively determined uniquely from resources of PDCCH to which the control information is allocated. In a case that the terminal device 102 detects the control information in the E-PDCCH 103, a resource of the PUCCH 105 available for the terminal device 102 is implicitly/suggestively determined uniquely from the resources of the E-PDCCH 103 to which the control information is allocated.

Figure 2:
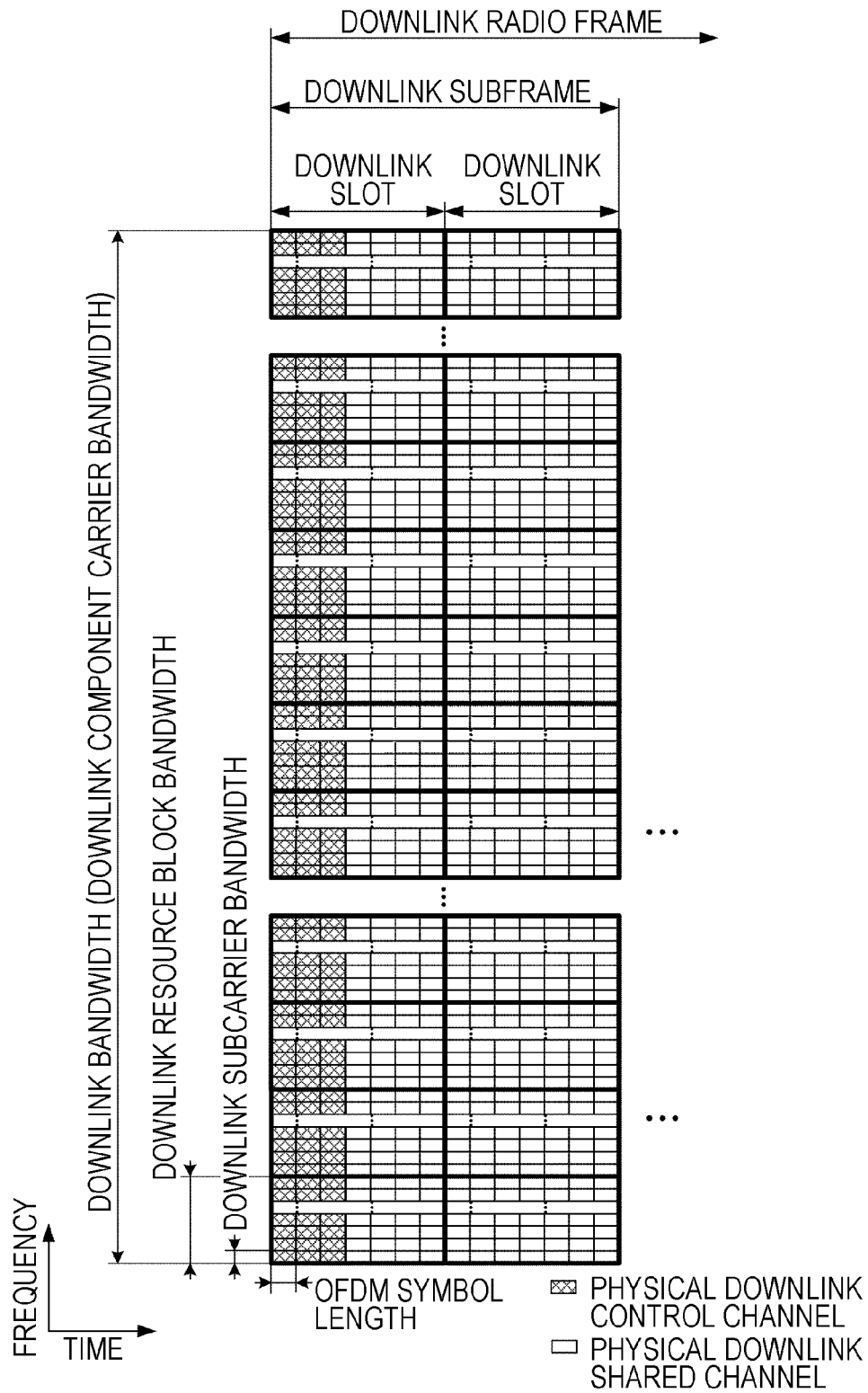
FIG. 2 illustrates an example of a downlink radio frame structure of the first embodiment.

FIG. 2 illustrates an example of a downlink radio frame structure of the first embodiment. An OFDM access system is used in the downlink. The PDCCH, and physical downlink shared channel (PDSCH) are allocated to the downlink. The downlink radio frame includes a downlink resource block (RB) pair. The downlink RB pair is a unit of allocation of the downlink radio resource, and includes a frequency bandwidth having a predetermined width (RB bandwidth), and a time duration (two slots=1 subframe). A single downlink RB pair includes two consecutive downlink RBs (RB bandwidth×slot) in the time domain. A single downlink RB includes 12 subcarriers in the frequency domain, and seven OFDM symbols in the time domain. A region defined by a single subcarrier in the frequency domain and defined by a single OFDM symbol in the time domain is referred to as a resource element (RE). The physical downlink control channel is used to transmit therethrough downlink control information including a terminal device identifier, scheduling information of the physical downlink shared channel, scheduling information of the physical uplink shared channel, modulation scheme, coding rate, and retransmission parameter. The downlink subframe in a single component carrier (CC) is described herein. The downlink subframe is defined on a per CC basis, and the downlink subframe is synchronized between CCs.

Figure 3:
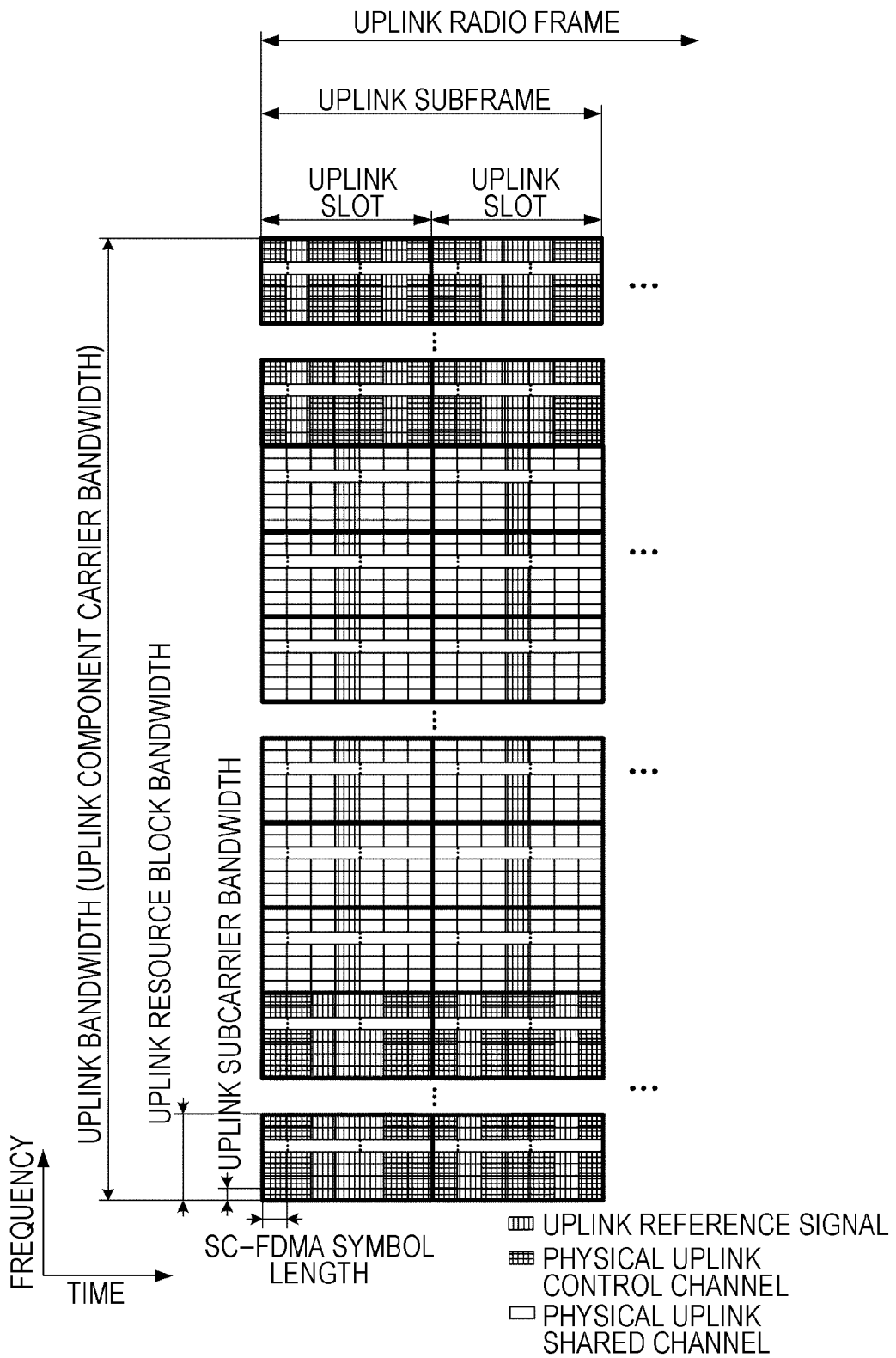
FIG. 3 illustrates an example of an uplink radio frame structure of the first embodiment.

FIG. 3 illustrates an example of an uplink radio frame structure of the first embodiment. The SC-FDMA is used in the uplink. The physical uplink shared channel (PUSCH), and the PUCCH are allocated to the uplink. An uplink reference signal is allocated to part of the PUSCH or PUCCH. The uplink radio frame includes an uplink RB pair. The uplink RB pair is an allocation unit of the uplink radio resource, and has a frequency bandwidth having a predetermined width (RB bandwidth) and a time duration (two slots=1 subframe). A single uplink RB pair includes two uplink RBs consecutive in the time domain (RB bandwidth× slot). A single uplink RB includes 12 subcarriers in the frequency domain, and seven SC-FDMA symbols in the time domain. The uplink subframe in one CC is described, but the uplink subframe is defined on a per CC.

Figure 4:
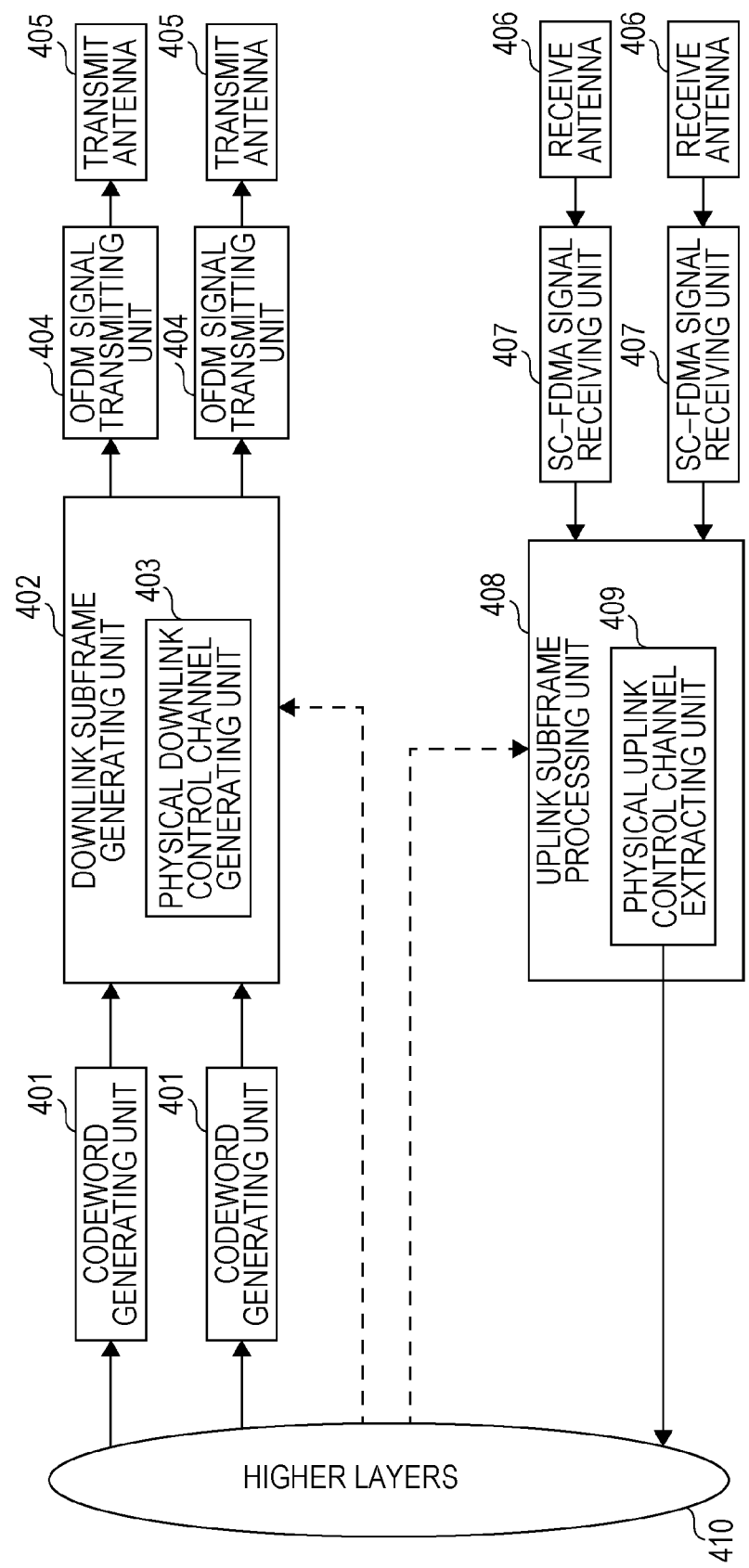
FIG. 4 diagrammatically illustrates an example of a block structure of a base station of the first embodiment.

FIG. 4 diagrammatically illustrates an example of a block structure of the base station 101 of the first embodiment. The base station 101 includes a codeword generating unit 401, a downlink subframe generating unit 402, an OFDM signal transmitting unit (physical control information notifying unit) 404, a transmit antenna (base station transmit antenna) 405, a receive antenna (base station receiving antenna) 406, an SC-FDMA signal receiving unit (response information receiving unit) 407, an uplink subframe processing unit 408, and a higher layer (higher layer control information notifying unit) 410. The downlink subframe generating unit 402 includes a physical downlink control channel generating unit 403. The uplink subframe processing unit 408 includes a physical uplink control channel extracting unit 409.

Figure 5:
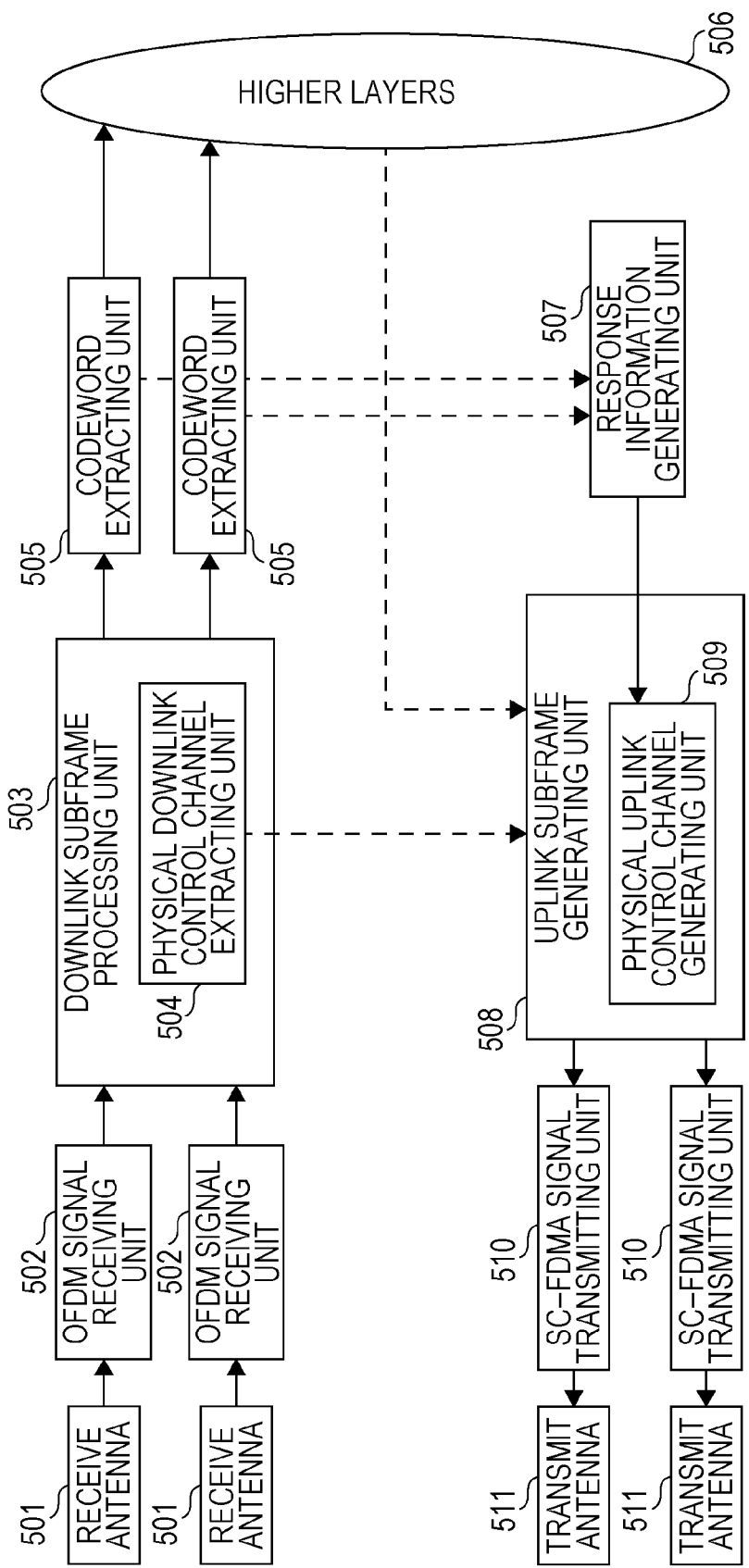
FIG. 5 diagrammatically illustrates an example of a block structure of a terminal device of the first embodiment.

FIG. 5 diagrammatically illustrates an example of a block structure of the terminal device 102 of the first embodiment. The terminal device 102 includes a receive antenna (terminal receive antenna) 501, an OFDM signal receiving unit (downlink receiving unit) 502, a downlink subframe processing unit 503, a codeword extracting unit (data extracting unit) 505, a higher layer (higher layer control information acquisition unit) 506, a response information generating unit 507, an uplink subframe generating unit 508, an SC-FDMA signal transmitting unit (response transmitting unit) 510, and a transmit antenna (terminal transmit antenna) 511. The downlink subframe processing unit 503 includes a physical downlink control channel extracting unit (downlink control channel detecting unit) 504. The uplink subframe generating unit 508 includes a physical uplink control channel generating unit (uplink control channel generating unit) 509.

The transmission and reception of the downlink data are described below with reference to FIG. 4 and FIG. 5. In the base station 101, the codeword generating unit 401 performs operations, including an error-correction coding operation and a rate-matching operation, on transmission data (also referred to as transport block) transmitted from the higher layer 410, thereby generating a codeword. A maximum of two codewords is concurrently transmitted in a single subframe in a single cell. The downlink subframe generating unit 402 generates a downlink subframe in response to an instruction from the higher layer 410. The codeword generated by the codeword generating unit 401 is converted into a modulation symbol sequence through a modulation operation, such as PSK (Phase Shift Keying) modulation or QAM (Quadrature Amplitude Modulation). The modulation symbol sequence is mapped to an RE in part of the RB, and is subjected to a pre-coding operation. A downlink subframe is thus generated on a per antenna port basis. The RE in the downlink is defined in response to each subcarrier on each OFDM symbol. The transmission data sequence transmitted from the higher layer 410 includes the control information (higher layer control information) for RRC (Radio Resource Control) signaling. The physical downlink control channel generating unit 403 generates a physical downlink control channel. The control information (the downlink control information and downlink grant) in the physical downlink control channel includes MCS (Modulation and Coding Scheme) indicating the modulation scheme in the downlink, the downlink resource allocation indicating RB for data transmission, the control information of HARQ for controlling HARQ (redundancy version, HARQ process number, and new data index), and PUCCH-TPC (Transmission Power Control) command for use in the closed loop transmission power control of the PUCCH. In response to an instruction from the higher layer 410, the downlink subframe generating unit 402 maps the physical downlink control channel to the RE in the downlink subframe. The downlink subframe on each antenna port generated by the downlink subframe generating unit 402 is modulated into an OFDM signal by the OFDM signal transmitting unit 404 and transmitted via the transmit antenna 405.

In the terminal device 102, the OFDM signal receiving unit 502 receives an OFDM signal via the receive antenna 501, and performs an OFDM demodulation operation on the OFDM signal. The physical downlink control channel extracting unit 504 in the downlink subframe processing unit 503 detects the PDCCH (first downlink control channel) or E-PDCCH (second downlink control channel). More specifically, the physical downlink control channel extracting unit 504 decodes a region enabled to place the PDCCH (first downlink control channel region) therein or a region enabled to place the E-PDCCH (second downlink control channel region or potential E-PDCCH) therein, and checks a pre-attached CRC (Cyclic Redundancy Check) bit (blind decoding). In other words, the physical downlink control channel extracting unit 504 monitors the PDCCH placed in the PDCCH region and the E-PDCCH placed in the PDSCH region different from the PDCCH region. If the CRC bit matches an ID allocated in advance by the base station, the downlink subframe processing unit 503 recognizes that the PDCCH or E-PDCCH has been detected, and extracts the PDSCH using the control information included in the detected PDCCH or E-PDCCH. More specifically, the downlink subframe processing unit 503 performs an RE demapping operation and a demodulation operation respectively corresponding to the RE mapping operation and the modulation operation performed by the downlink subframe generating unit 402. The PDSCH extracted from the received downlink subframe is transferred to the codeword extracting unit 505. The codeword extracting unit 505 performs a rate matching operation and an error-correction coding operation respectively corresponding to the rate matching operation and the error-correction decoding operation performed in the codeword generating unit 401, extracts a transport block, and transmits the transport block to the higher layer 506. More specifically, in a case that the physical downlink control channel extracting unit 504 has detected the PDCCH or E-PDCCH, the codeword extracting unit 505 extracts the transmission data in the PDSCH related to the detected PDCCH or E-PDCCH, and then transmits the transmission data to the higher layer 506.

The transmission and reception of the HARQ response information responsive to the downlink transmission data are described below. If the terminal device 102 has determined whether the codeword extracting unit 505 has successfully extracted the transport block, information related to success or failure of the extraction is transferred to the response information generating unit 507. The response information generating unit 507 generates HARQ response information, and then transfers the HARQ response information to the physical uplink control channel generating unit 509 in the uplink subframe generating unit 508. In the uplink subframe generating unit 508, the physical uplink control channel generating unit 509 generates the PUCCH including the HARQ response information (uplink control information) in accordance with a parameter transferred from the higher layer 506 and a resource where the PDCCH or E-PDCCH is placed by the physical downlink control channel extracting unit 504. The generated PUCCH is mapped to an RB in the uplink subframe. More specifically, the PUCCH is generated with the response information mapped to the PUCCH resource. The SC-FDMA signal transmitting unit 510 performs an SC-FDMA modulation on the uplink subframe, thereby generating an SC-FDMA signal, and transmitting the SC-FMDA signal via the transmit antenna 511.

In the base station 101, the SC-FDMA signal receiving unit 407 receives the SC-FDMA signal via the receive antenna 406, and performs an SC-FDMA demodulation operation on the SC-FDMA signal. In response to an instruction from the higher layer 410, the uplink subframe processing unit 408 extracts the RB mapped to the PUCCH. The physical uplink control channel extracting unit 409 extracts HARQ response control information included in the PUCCH. The extracted HARQ response control information is transmitted to the higher layer 410. The higher layer 410 uses the HARQ response control information to control HARQ.

The PUCCH resource in the uplink subframe generating unit 508 is described below. The HARQ response control information is spread in the SC-FDMA sample region using a cyclically shifted pseudo CAZAC (Constant-Amplitude Zero-AutoCorrelation) sequence, and is further spread in 4 SC-FDMA symbols in a slot using four orthogonal cover code (OCC) having a code length of 4. The symbols spread using the two codes are mapped to two RBs different in frequency. In this way, the PUCCH resource is defined by three elements by the cyclic shift amount, the orthogonal code, and the mapped RB. The cyclic shift in the SC-FDMA sample region may be expressed by a phase rotation that uniformly increases in the frequency domain.

Figure 6:
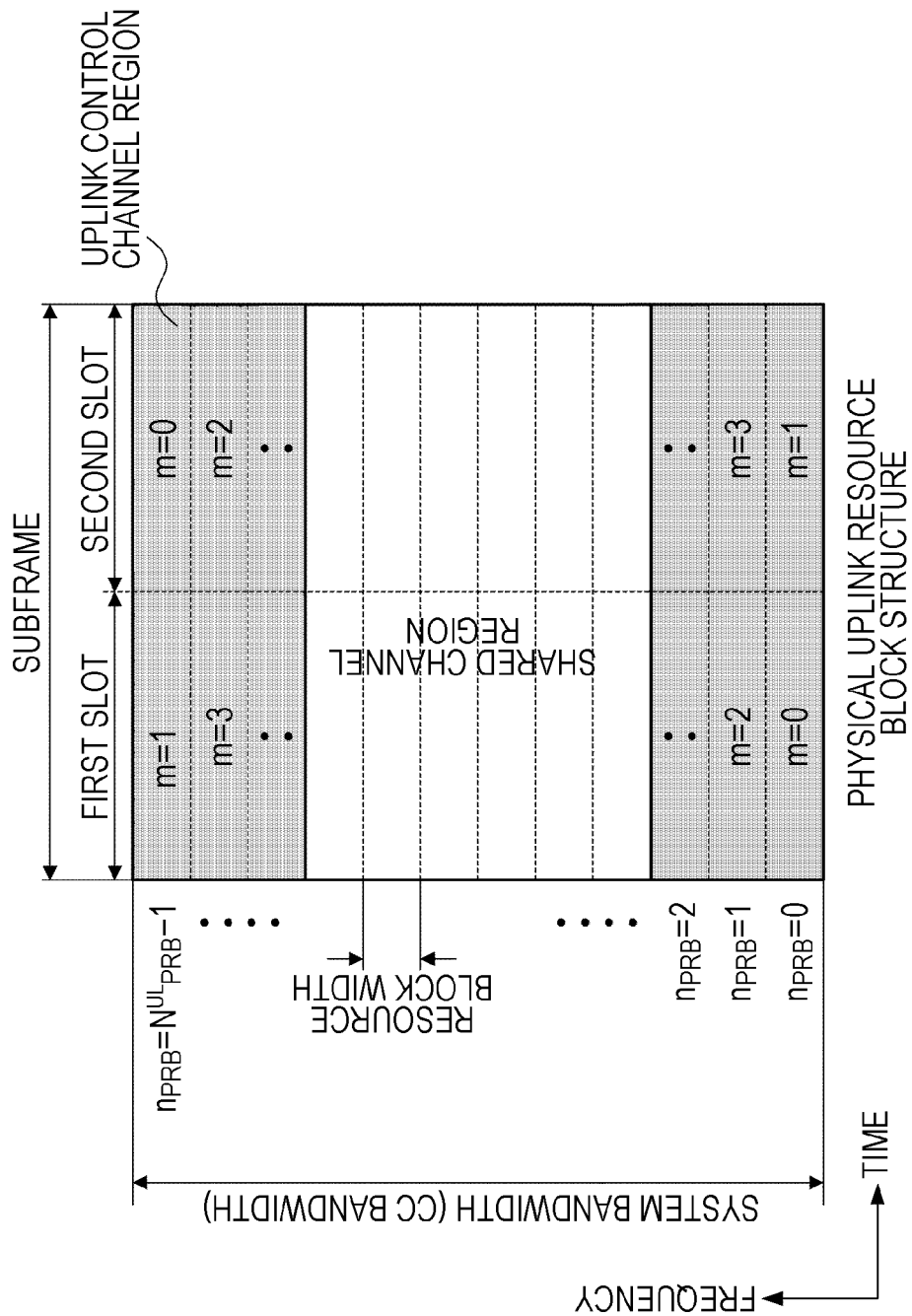
FIG. 6 illustrates a physical uplink resource block structure in an uplink control channel region to which PUCCH of the first embodiment is allocated.

FIG. 6 illustrates a physical uplink resource block structure (uplink control channel physical resource) in the uplink control channel region to which the PUCCH is allocated. Each RB pair includes two RBs different in frequency, namely, a first slot and a second slot. A single PUCCH is placed one of the RB pairs of m=0, 1, 2, . . . .

FIG. 7 illustrates an association table indicating the uplink control channel logic resource of the first embodiment. An example of the PUCCH resource includes as the elements thereof three orthogonal codes OC0, OC1, and OC2, six cyclic shift amounts CS0, CS2, CS4, CS6, CS8, and CS10, and m representing a frequency resource. A combination of an orthogonal code and a cyclic shift amount, and m are uniquely defined for $n_{PUCCH}$ as an index indicating a PUCCH resource (uplink control channel logic resource). An association of $n_{PUCCH}$ of FIG. 7 with the combination of the orthogonal code, the cyclic shift amount, and m is described for exemplary purposes. Another association is also possible. For example, consecutive $n_{PUCCH}$ may be associated with changing cyclic shift amounts, or with changing m. Also, cyclic shift amounts CS1, CS3, CS5, CS7, CS9, and CS11, different CS0, CS2, CS4, CS6, CS8, and CS10, may be employed. As illustrated in FIG. 7, the value of m is $N_{F2}$ or higher. The frequency resources with m less than $N_{F2}$ are $N_{F2}$ frequency resources reserved for the PUCCH transmission for feedback of the channel status information.

Figure 8:
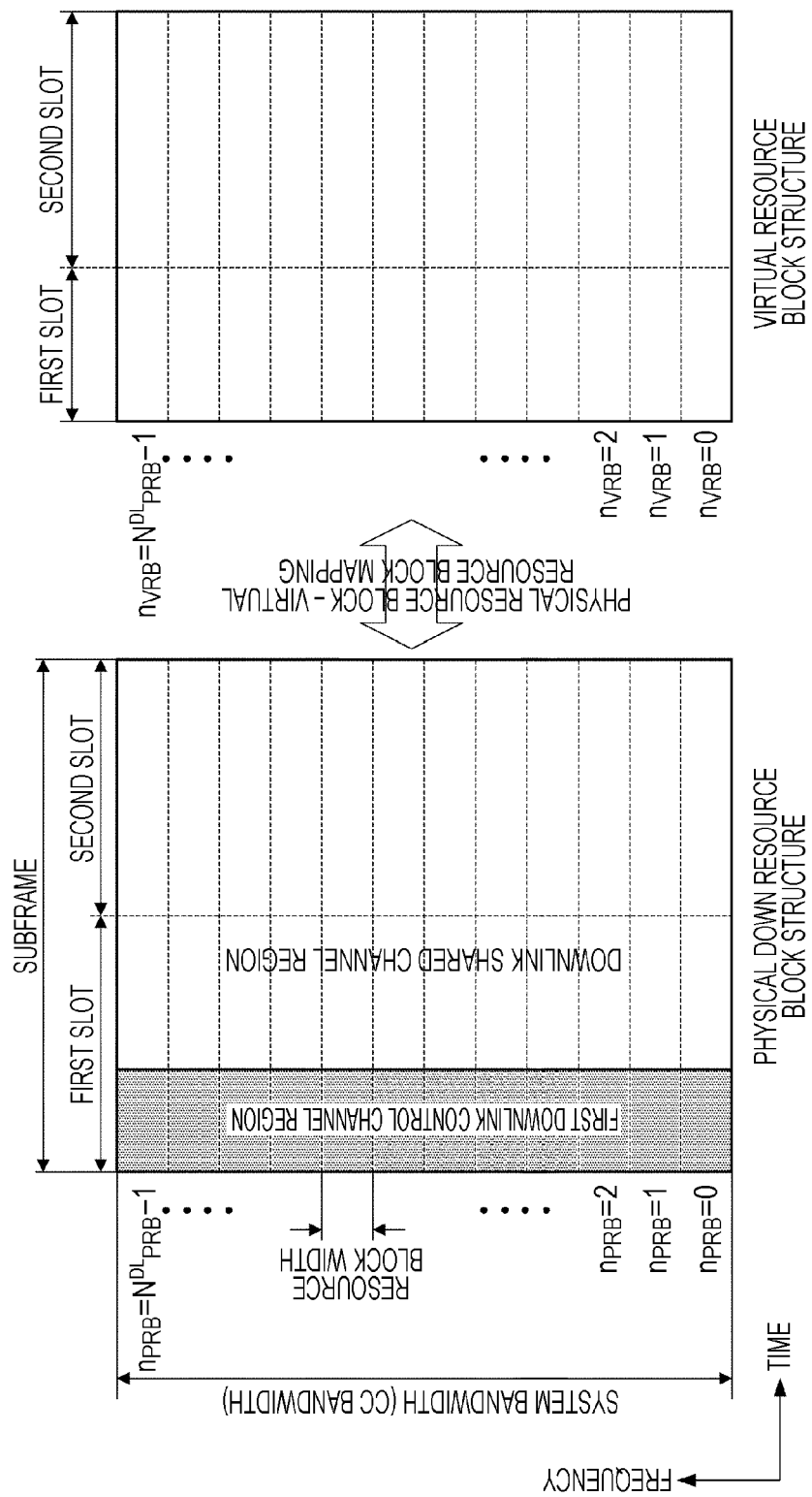
FIG. 8 illustrates a physical resource block PRB and a virtual resource block VRB in a PDCCH region and a PDSCH region of the first embodiment.

The PDCCH and E-PDCCH are described next. FIG. 8 illustrates a physical resource block PRB and a virtual resource block VRB in a PDCCH region and a PDSCH region of the first embodiment. The RB on the actual subframe is referred to as PRB. RB that is a logic resource used in the RB allocation is referred to as VRB. $N^{DL}_{PRB}$ is a PRB number that is arranged in a frequency direction in the downlink CC. PRB (or PRB pair) is numbered with a number $n_{PRB}$, and $n_{PRB}$ is 0, 1, 2, ..., $N^{DL}_{PRB}-1$ in the order of from a low frequency to a high frequency. A VRB number arranged in the frequency direction in the downlink CC equals $N^{DL}_{PRB}$. VRB (or VRB pair) is numbered with a number $n_{VRB}$. $n_{VRB}$ is 0, 1, 2, ..., $N^{DL}_{PRB}-1$ in the order from a low frequency to a high frequency. Each PRB and each VRB are expressly or implicitly/suggestively mapped. The number herein may also be referred to as an index.

The PDCCH includes multiple control channel elements (CCEs) in the PDCCH region. The CCE includes multiple downlink source elements REs (a resource defined by a single OFDM symbol and a single subcarrier). The CCE in the PDCCH region is tagged with a number $n_{CCE}$ to identify the CCE. The numbering of the CCE is performed in accordance with a predetermined rule. The PDCCH includes a set of multiple CCEs (CCE Aggregation). The number of CCEs forming the set is referred to "CCE aggregation level". The CCE aggregation level forming the PDCCH is configured by the base station 101 based on the coding rate configured in the PDCCH, and the number of bits of DCI (Downlink Control Information) included in the PDCCH (the control information transmitted in PDCCH or E-PDCCH). A combination of CCE aggregation levels available for the terminal device is predetermined. Also, a set of n CCEs is referred to as "CCE aggregation level n".

A single REG (RE group) includes four consecutive REs in the frequency domain. A single CCE includes nine different REGs dispersed in the PDCCH region in the frequency domain and the time domain. More specifically, a block interleaver interleaves all the numbered REGs in the entire downlink CC according to an REG unit, and the nine interleaved consecutively numbered REGs form a single CCE.

An SS (search space) is configured as a space (search region) where the PDCCH is searched. The SS includes multiple CCEs. The CCE is numbered in advance, and the SS is formed of consecutively numbered multiple CCEs. The number of CCEs forming a given SS is predetermined. The SSs of each CCE aggregation level include a set of multiple PDCCH candidates. The SSs are classified into the cell-specific common search space where the minimum CCE number is common in a cell (Cell-specific SS or common SS), and UE-specific search space USS where the minimum CCE is specific to the terminal (UE-specific SS). Placed in the CSS is the PDCCH which control information read by multiple terminal devices 102, such as system information, or paging related information, is allocated to (included into), and the PDCCH which fallback to lower transmission scheme or downlink/uplink grant indicating a random access instruction is allocated to (included into).

The base station 101 transmits the PDCCH using one or more CCEs in the SS configured in the terminal device 102. The terminal device 102 decodes the received signal using one or more CCEs in the SS, and performs an operation to detect the PDCCH addressed thereto. As previously described, this operation is referred to as the blind coding. The terminal device 102 configures an SS different on a per CCE aggregation level. The terminal device 102 then performs the blind coding using a predetermined combination of CCEs in the SS different from CCE aggregation level to CCE aggregation level. In other words, the terminal device 102 performs the blind coding on each PDCCH candidate in the SS different from CCE aggregation level to CCE aggregation level. A sequence of these operations by the terminal device 102 is referred to as the monitoring of the PDCCH.

Figure 9:
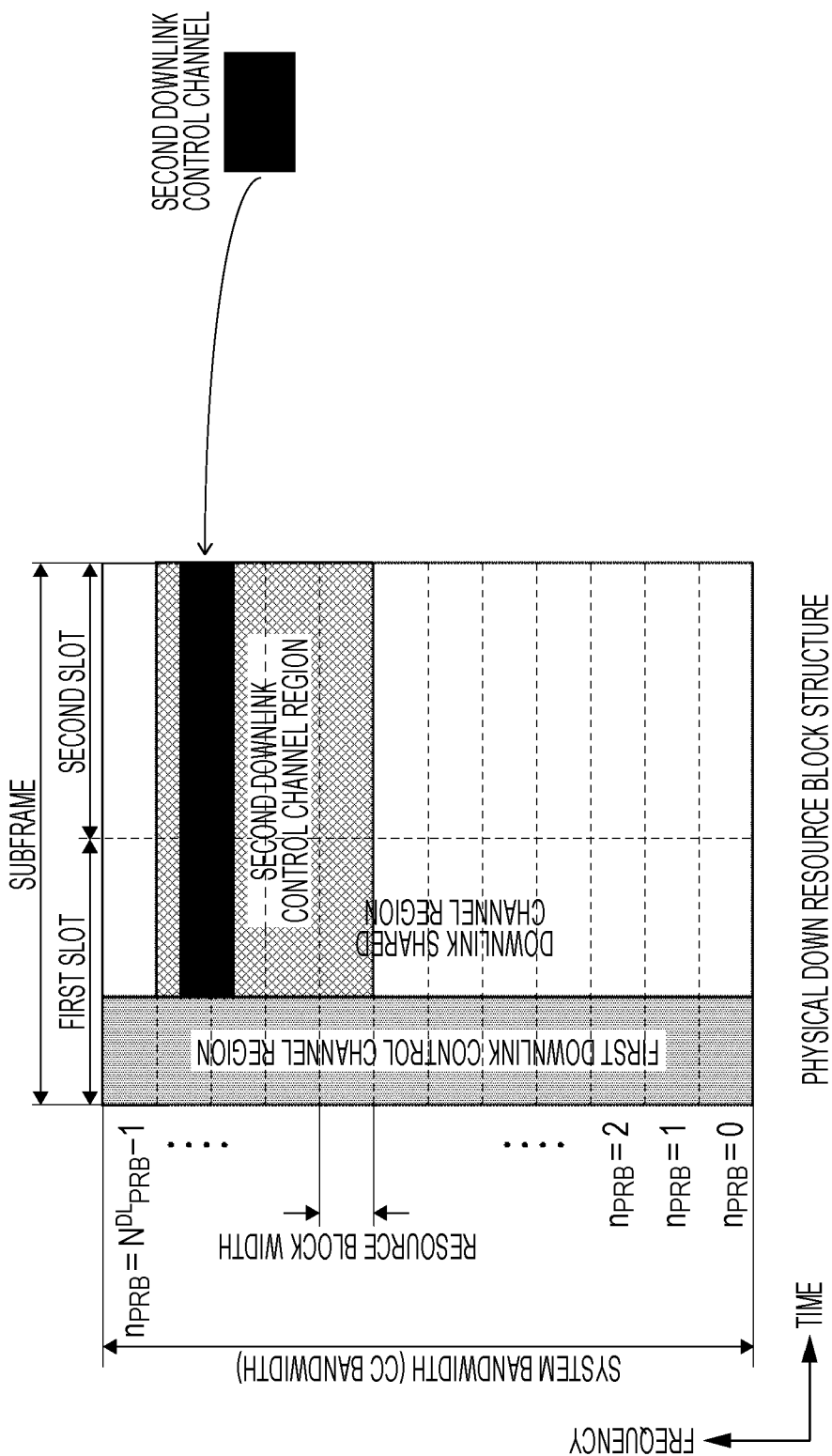
FIG. 9 illustrates an example of mapping of E-PDCCH of the first embodiment.

FIG. 9 illustrates an example of the mapping of the E-PDCCH in the E-PDCCH region. In this localized mapping method, a single E-PDCCH is mapped to the RE in a localized band.

Figure 10:
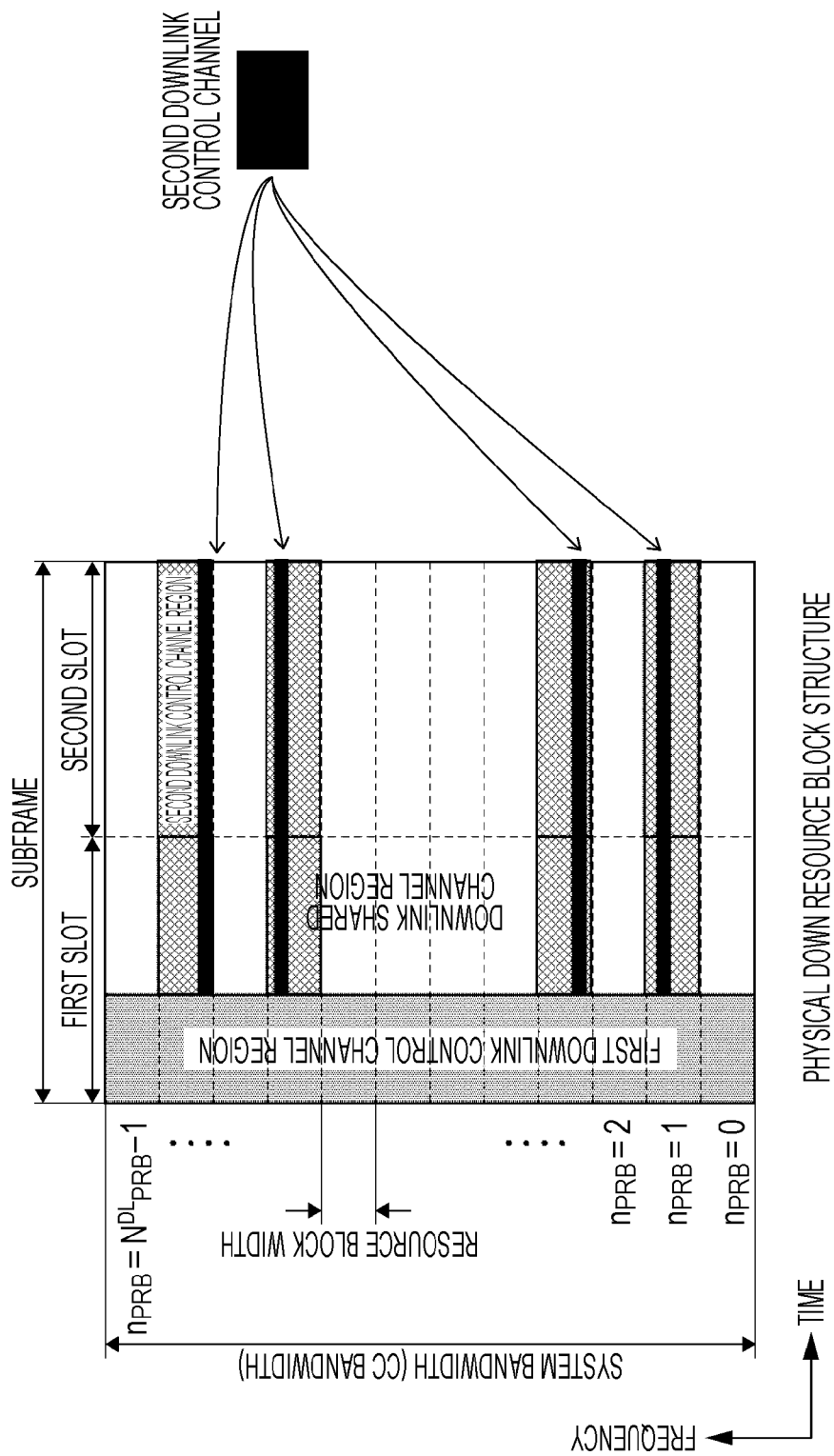
FIG. 10 illustrates another example of the mapping of E-PDCCH of the first embodiment.

FIG. 10 illustrates another example of the mapping of the E-PDCCH in the E-PDCCH region. In this distributed mapping, a single E-PDCCH is mapped to the REs in localized bands spaced apart in the band frequency axis.

Some (or all) PRB pairs are configured in the E-PDCCH region (a region where the E-PDCCH may be potentially placed). In the mapping method specified expressly or implicitly/suggestively, the E-PDCCH is placed in some (or all) PRB pairs in the PDSCH region.

Figure 11:
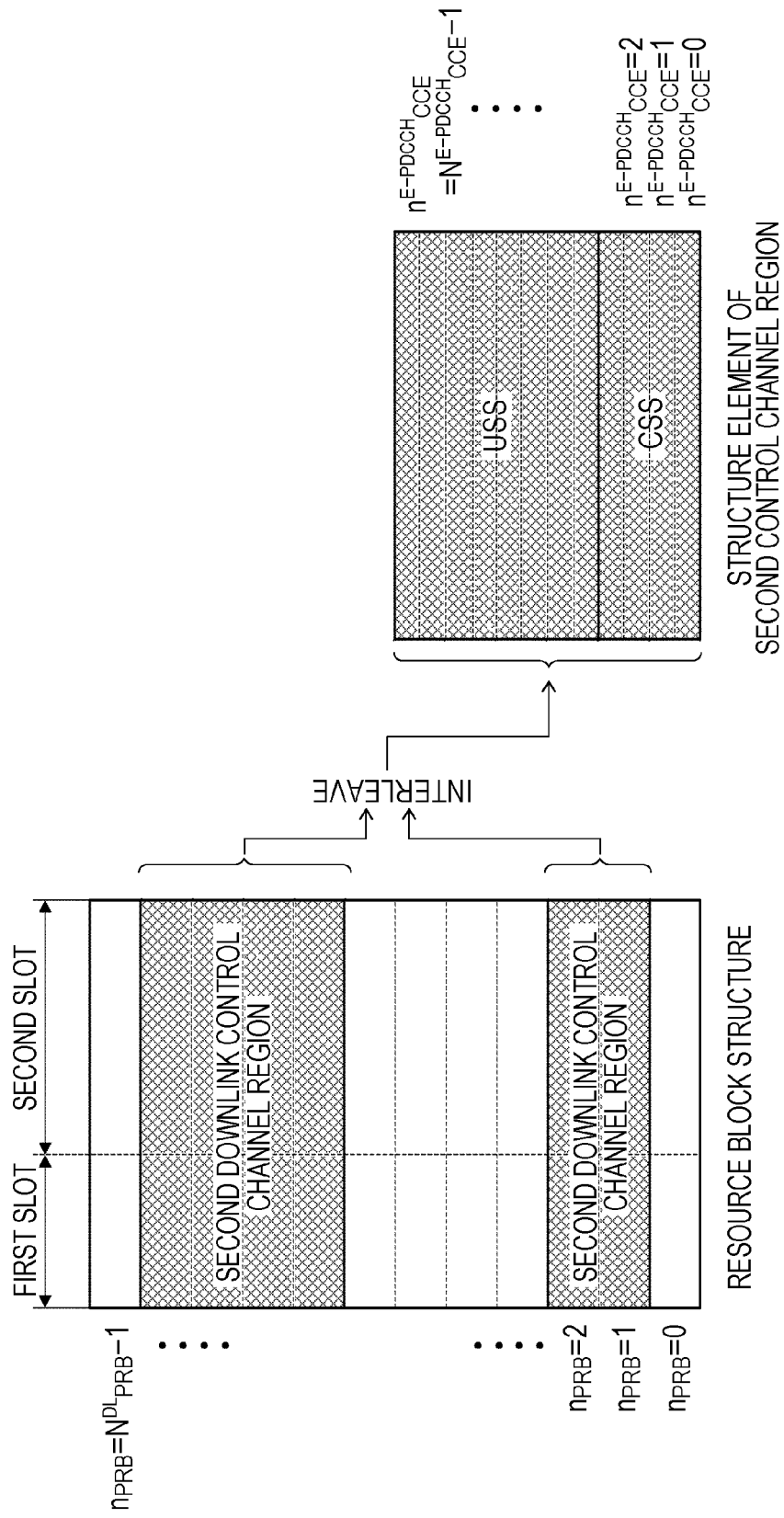
FIG. 11 illustrates E-PDCCH elements of the first embodiment.

FIG. 11 illustrates an example of elements of the E-PDCCH region. $N^{E\text{-}PDCCH}_{PRB}$ PRB pairs configured in the E-PDCCH region are extracted from among $N^{DL}_{PRB}$ PRB pairs, and the REs in the extracted region are interleaved and divided into the CCEs as the elements of the E-PDCCH. The interleave method may be preferably different depending on whether the localized mapping or the dispersal mapping is used. In a case that the localized mapping is used, the interleave method concentrates the REs forming a single CCE in a localized band. In a case that the dispersal mapping is used, the interleave method disperses the REs forming a single CCE within the E-PDCCH region. The E-PDCCH element is tagged with number $n^{E\text{-}PDCCH}_{CCE}$. For example, the numbers from a low frequency to a high frequency are 0, 1, 2, ..., $n^{E\text{-}PDCCH}_{CCE}-1$. More specifically, in the frequency domain, a set of $n^{E\text{-}PDCCH}_{PRB}$ PRBs is configured for a potential E-PDCCH transmission through higher layer signaling (for example, UE-specific signaling or cell-common signaling), and $n^{E\text{-}PDCCH}_{CCE}$ E-PDCCH elements become available. The following discussion is based on the premise that, as the SS of the PDCCH, the SS formed of the CCEs of the E-PDCCH are also divided into the CSS and the USS. However, the SS formed of the CCEs of the E-PDCCH may be USS alone.

The CCE in the E-PDCCH region is tagged with a number $n^{E\text{-}PDCCH}_{CCE}$ for identification. The CCEs in the E-PDCCH region are separately placed in the first slot and the second slot, and the numbers are individually allocated to the CCEs for identification. In the discussion that follows, $n^{E\text{-}PDCCH}_{CCE}$ and $n_{CCE}$ are independently configured. In other words, part of the value of $n^{E\text{-}PDCCH}_{CCE}$ is the same value that $n_{CCE}$ takes.

Figure 12:
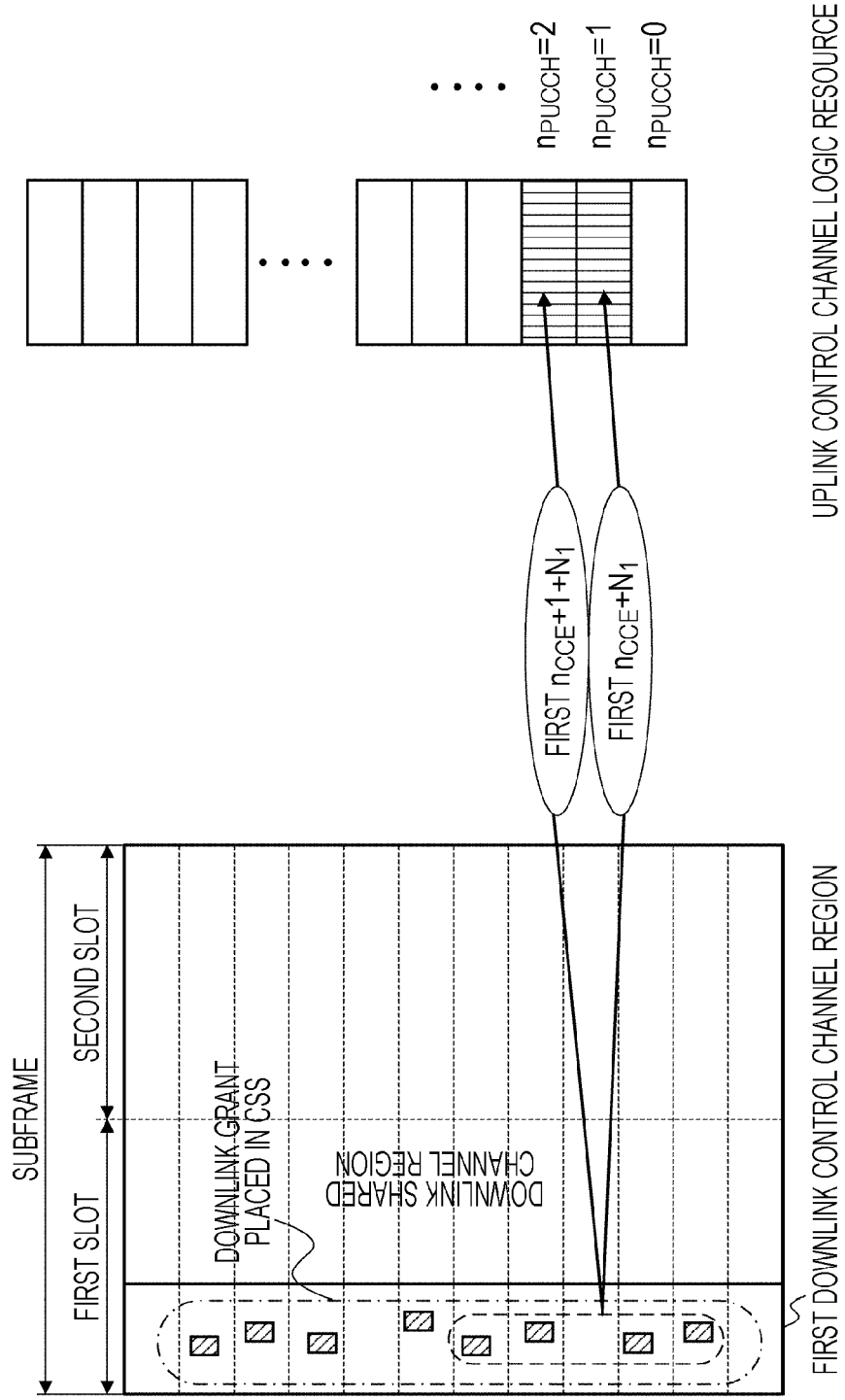
FIG. 12 illustrates an example of a downlink grant and a PUCCH resource allocation of the first embodiment.

The downlink grant and the allocation of the PUCCH source are described below. FIG. 12 illustrates an example of the downlink grant and the PUCCH resource allocation. Upon detecting a downlink grant in the CSS in the PDCCH region, the terminal device 102 reports the HARQ response information of the downlink transmission data (PDSCH) corresponding to the downlink grant using a PUCCH resource responsive to a minimum CCE number allocated to the CCE out of the CCEs forming the PDCCH including the downlink grant. In a case that the base station 101 places the PDCCH including the downlink grant in the CSS, the base station 101 places the PDCCH in the CCE responsive to the PUCCH resource by which the terminal device 102 reports the HARQ response information of the downlink transmission data (PDSCH) responsive to the downlink. The base station 101 receives the HARQ response information responsive to the PDSCH transmitted to the terminal device 102 via the pre-scheduled PUCCH. More specifically, as illustrated in FIG. 12, a PUCCH resource having an index $n_{PUCCH}$ matching the value resulting from adding $N_1$ as a cell-specific parameter to the CCE number $n_{CCE}$ of a first CCE, from among the CCEs forming the PDCCH including the downlink grant, is a PUCCH resource allocated to the HARQ response information of the downlink transmission data responsive to the downlink grant.

There may be two or more pieces of the HARQ response information because the downlink transmission data responsive to the downlink grant includes two or more codewords, or a single piece of response information may be diversity-transmitted using multiple PUCCH resources. In such a case, multiple PUCCH resources responsive to a single PDCCH may be needed. In such a case, from among the CCEs forming the PDCCH including the downlink grant, another PUCCH resource larger than a first PUCCH resource is used in addition to the first PUCCH resource which is responsive to the CCE having the minimum CCE number. More specifically, as illustrated in FIG. 12, the PUCCH resources allocated to the HARQ response information of the downlink transmission data responsive to the downlink grant are used from among the CCE forming the PDCCH including the downlink grant. Namely, the used PUCCH resources are the PUCCH resource having an index $n_{PUCCH}$ matching a value resulting from adding $N_1$ as a cell-specific parameter to the CCE number $n_{CCE}$ of the first CCE, and the PUCCH resource having an index $n_{PUCCH}$ matching the value resulting from adding a value resulting from adding $N_1$ as the cell-specific parameter and 1 to the CCE number $n_{CCE}$ of the first CCE. If multiple PUCCH resources are needed, PUCCH resources having one-by-one increasingly larger indexes may be employed.

Figure 13:
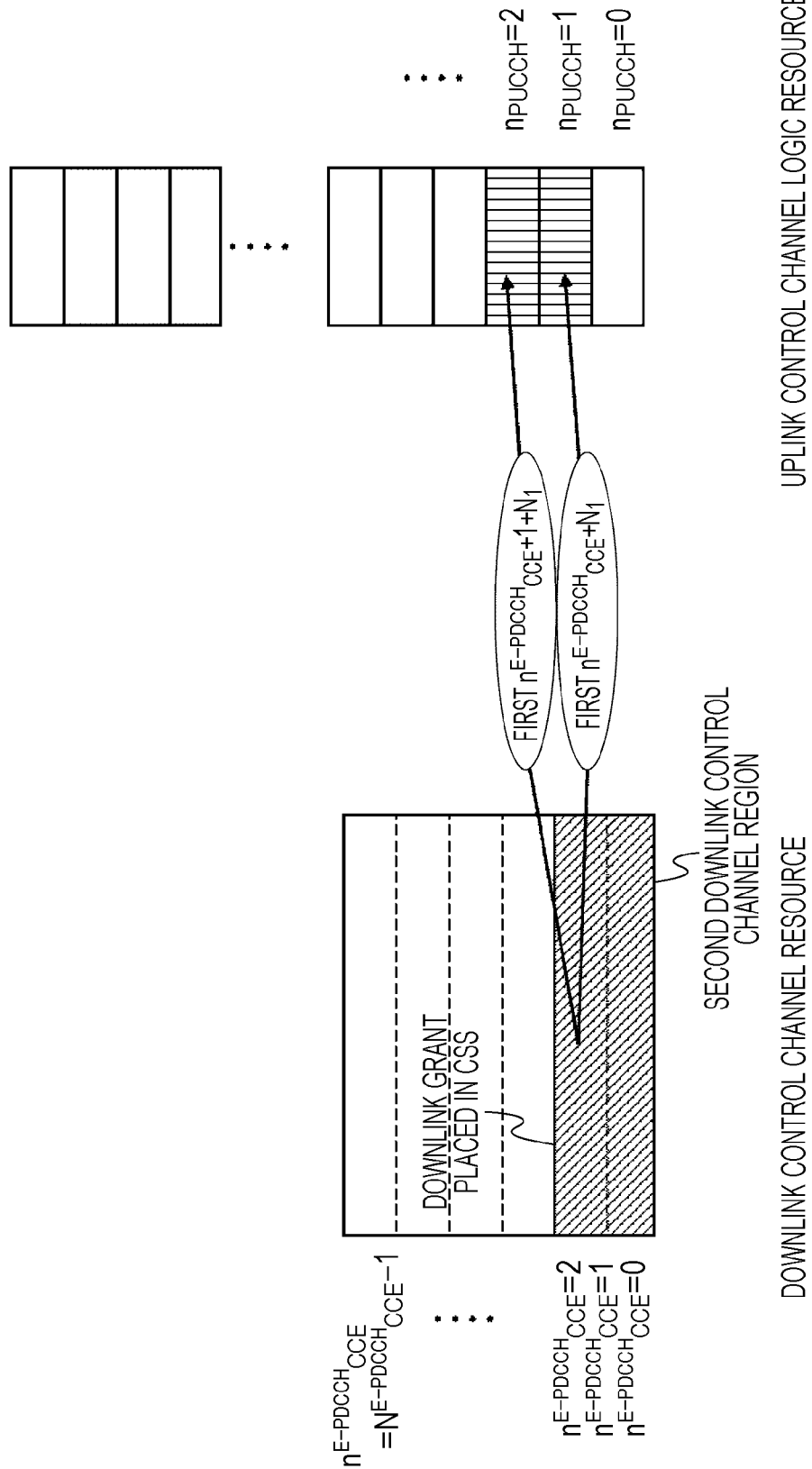
FIG. 13 illustrates another example of the downlink grant and the PUCCH resource allocation of the first embodiment.

FIG. 13 illustrates another example of the downlink grant and the PUCCH resource allocation. Upon detecting a downlink grant in the CSS in the E-PDCCH region, the terminal device 102 reports the HARQ response information of the downlink transmission data corresponding to the downlink grant (PDSCH) using a PUCCH resource responsive to the minimum CCE number of the CCE out of the CCEs forming the E-PDCCH including the downlink grant. In a case that the base station 101 places the E-PDCCH including the downlink grant, the base station 101 places the E-PDCCH in the CCE responsive to the PUCCH resource by which the terminal device 102 reports the HARQ response information of the downlink transmission data (PDSCH) responsive to the downlink. The base station 101 receives the HARQ response information corresponding to the PDSCH transmitted to the terminal device 102 via the pre-scheduled PUCCH. More specifically, as illustrated in FIG. 13, a PUCCH resource having an index $n_{PUCCH}$ matching the value resulting from adding $N_1$ as a cell-specific parameter to the CCE number $n^{E\text{-}PDCCH}_{CCE}$ of a first CCE, from among the CCEs forming the E-PDCCH including the downlink grant, is a PUCCH resource allocated to the HARQ response information of the downlink transmission data responsive to the downlink grant. As described above, the CCE in the E-PDCCH region and the CCE in the PDCCH region are respectively separately numbered as the CCE $n^{E\text{-}PDCCH}_{CCE}$ and the CCE $n_{CCE}$. If one or more PDCCHs and one or more E-PDCCHs are placed in the same subframe, the scheduling operation to place the downlink grant in the CCEs is performed such that the CCE number $n_{CCE}$ of the first CCE in each PDCCH and the CCE number $n^{E\text{-}PDCCH}_{CCE}$ of the first CCE in each E-PDCCH are different from each other.

Alternatively, $n^{E\text{-}PDCCH}_{CCE}$ and $n_{CCE}$ are numbered in association such that the CCE number $n_{CCE}$ of the first CCE in each PDCCH and the CCE number $n^{E\text{-}PDCCH}_{CCE}$ of the first CCE in each E-PDCCH are all different from each other. For example, a first (minimum) value of $n^{E\text{-}PDCCH}_{CCE}$ may be configured to be the value of $N_{CCE}$ or a predetermined value slightly larger than the value of $N_{CCE}$. In this way, part of the value of $n^{E\text{-}PDCCH}_{CCE}$ is not the same value $n_{CCE}$ takes, and the PUCCH resources do not contend with each other in the same subframe.

Multiple PUCCH resources responsive to a single E-PDCCH may be needed. In such a case, from among the CCEs forming the E-PDCCH including the downlink grant, another PUCCH resource larger than a first PUCCH resource is used in addition to the first PUCCH resource which is responsive to the CCE having the minimum CCE number. More specifically, as illustrated in FIG. 13, from among the CCEs forming the E-PDCCH including the downlink grant, the PUCCH resource having an index $n_{PUCCH}$ matching the value resulting from adding $N_1$ as a cell-specific parameter to the CCE number $n^{E\text{-}PDCCH}_{CCE}$ of a first CCE, and the PUCCH resource having an index $n_{PUCCH}$ matching the value resulting from adding $N_1$ as a cell-specific parameter and 1 to the CCE number $n^{E\text{-}PDCCH}_{CCE}$ of the first CCE are the PUCCH resources that are allocated to the HARQ response information of the downlink transmission data responsive to the downlink grant. Similarly, if multiple PUCCH resources are needed, PUCCH resources having one-by-one increasingly larger indexes may be employed. In order to place one or more PDCCHs and one or more E-PDCCHs in the same subframe, the base station 101 performs the scheduling operation to place the downlink grant in the CCEs such that the CCE number $n_{CCE}$ of the first CCE, and the next larger CCE number $n_{CCE}$ of the next CCE in each PDCCH and the CCE number $n^{E\text{-}PDCCH}_{CCE}$ of the first CCE, and the next larger CCE number $n^{E\text{-}PDCCH}_{CCE}$ of the next CCE in each E-PDCCH are all different numbers.

In the mapping method described above, the PUCCH resources are uniquely determined in response to the resources having the downlink grant and the cell-specific parameters in a case that the mapping is performed to the PUCCH resources according to the downlink grant placed in the CSS. The mapping method described below is configured to determine the PUCCH resource based on the UE-specific parameter.

Figure 14:
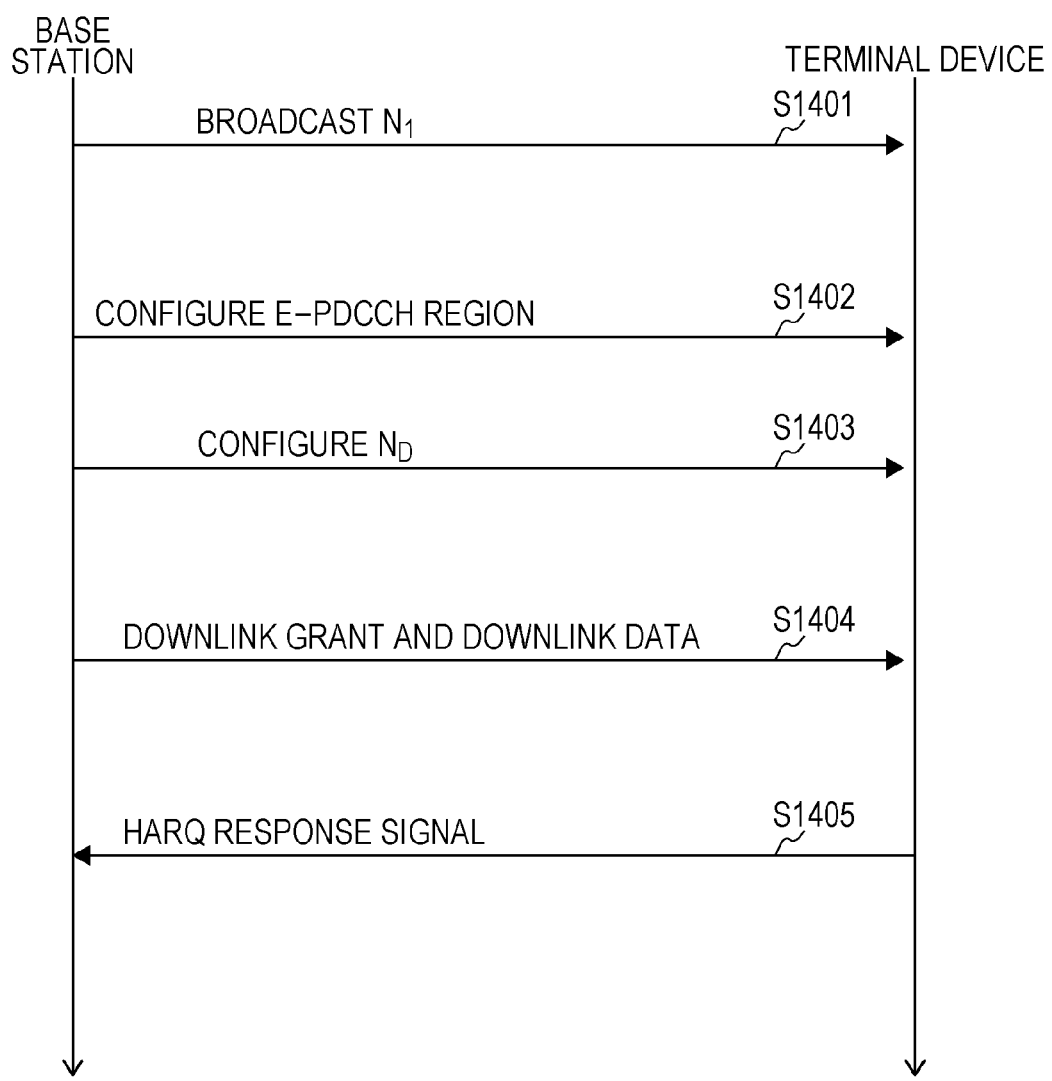
FIG. 14 illustrates the downlink data transmission and the flow of a response procedure between the base station and the terminal device of the first embodiment.

FIG. 14 illustrates the downlink data transmission and the flow of a response procedure between the base station 101 and the terminal device 102. The base station 101 broadcasts, to the terminal devices 102, $N_1$ as a cell-specific parameter using a broadcast channel, and the terminal device 102 receives the information (step S1401). $N_1$ indicates a common shift amount commonly configured on all terminal devices. In the example here, the base station 101 broadcasts $N_1$. The present invention is not limited to this method. The same effect is expected if $N_1$ is notified through individual signaling (RRC signaling) to each terminal device 102.

The base station 101 notifies the terminal device 102 of control information specifying (configuring or notifying) the E-PDCCH region through the RRC signaling. In response to the control information, the terminal device 102 configures the E-PDCCH region (step S1402). To specify the E-PDCCH region, some or all RBs in the frequency band are specified as previously described. In combination with this method, part of subframes in the time domain may be specified as a subframe (according to which the terminal device monitors the E-PDCCH) where the E-PDCCH is placed. For example, the period of the subframe and the offset value from a reference subframe may be specified. Alternatively, whether the E-PDCCH is enabled to be placed in a radio frame (10 subframes) or in each subframe in multiple radio frames may be expressed in a bit-map format.

Using the RRC signaling, the base station 101 notifies the terminal device 102 of the control information specifying $N_D$ as a parameter individually configurable on each terminal device 102, and the terminal device 102 configures $N_D$ using the control information (step S1403). $N_D$ indicates an individual shift amount individually configured on each terminal device 102. $N_D$ is configured after the base station 101 has configured the E-PDCCH region. The present invention is not limited to this method. For example, the E-PDCCH region may be configured after the base station 101 has configured $N_D$ or the E-PDCCH region and $N_D$ may be concurrently configured. The default value of $N_D$ may be configured to zero. In a case that the signaling is not performed in step S1403 ($N_D$ is not configured), the subsequent operation may be performed assuming that $N_D$ is zero.

The base station 101 transmits to the terminal device 102 the downlink grant and the downlink transmission data responsive to the downlink grant using the PDCCH or E-PDCCH. The terminal device 102 receives the downlink grant and the downlink transmission data (step S1404). The terminal device 102 having received the downlink transmission data generates the HARQ response information.

Finally, the terminal device 102 determines the PUCCH resource based on $N_1$ acquired in step S1401, configuration information of the E-PDCCH region acquired in step S1402, $N_D$ acquired in step S1403, and information concerning the resource of the downlink grant detected in step S1404. The terminal device 102 reports the HARQ response information using the determined PUCCH resource (step S1405).

The configuration of the E-PDCCH region in step S1402 has been described. If the downlink grant is transmitted via the PDCCH in step S1404, the E-PDCCH region may not necessarily have to be configured.

Figure 15:
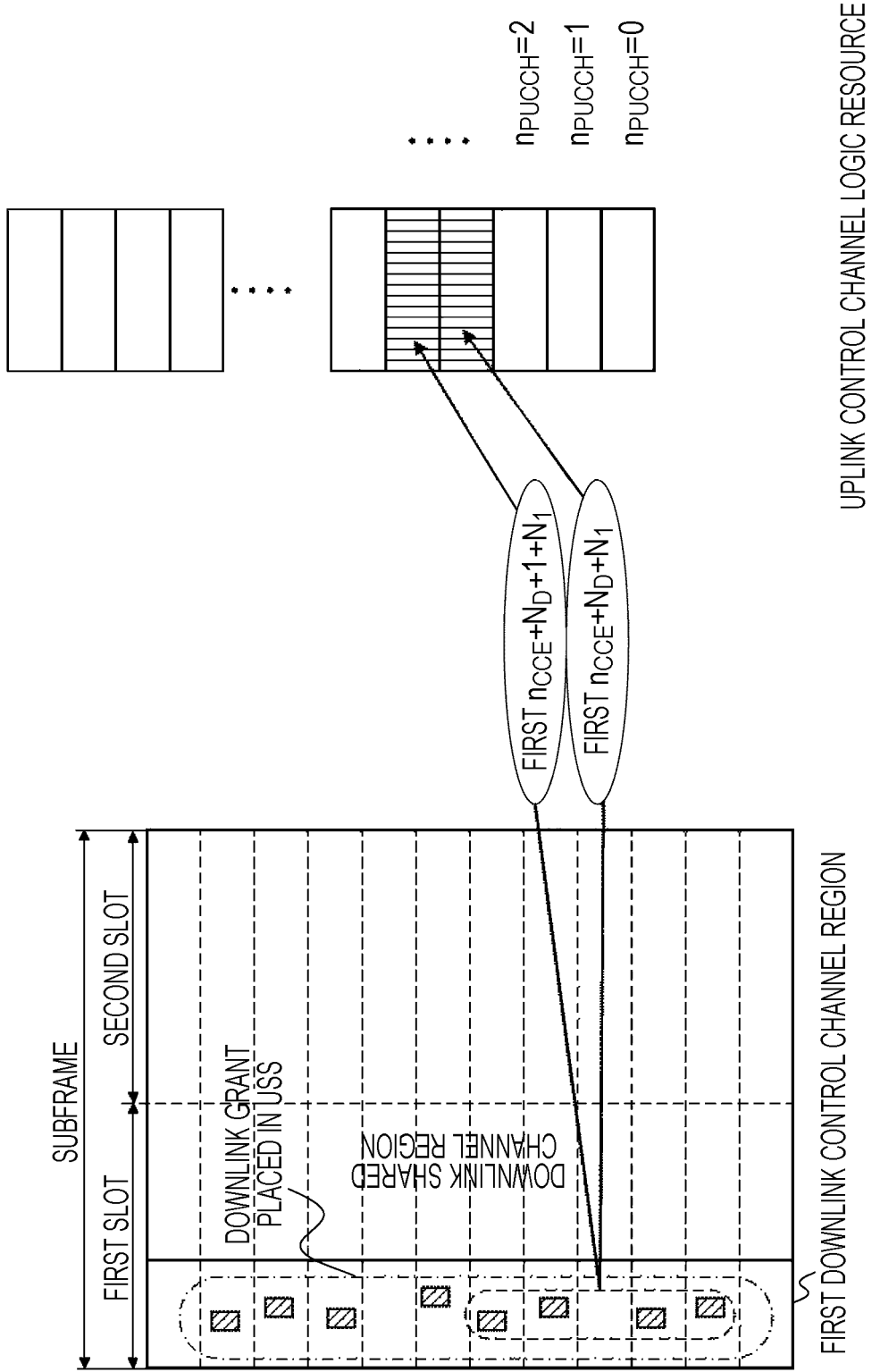
FIG. 15 illustrates another example of the downlink grant and the PUCCH resource allocation of the first embodiment.

The downlink grant and the PUCCH resource allocation in this case are described below. FIG. 15 illustrates another example of the downlink grant and the PUCCH resource allocation. The downlink grant is placed in the USS in the E-PDCCH region. The structure of the CCEs in the E-PDCCH region and the CCE number allocation remain unchanged from those in FIG. 13.

The PUCCH resource that is determined by adding $N_D$ as a UE-specific parameter to the CCE number $n_{CCE}$ of the first CCE is used from among the CCEs forming the PDCCH including the downlink grant. More specifically, as illustrated in FIG. 15, the PUCCH resource having an index $n_{PUCCH}$ matching a value resulting from adding the UE-specific parameter $N_D$ and the cell-specific parameter $N_1$ to the CCE number $n_{CCE}$ of the first CCE, from among the CCEs forming the PDCCH including the downlink grant, is a PUCCH resource that is allocated to the HARQ response information of the downlink transmission data corresponding to the downlink grant. As described above, the CCE number $n^{E\text{-}PDCCH}_{CCE}$ of the CCE in the E-PDCCH region and the CCE number $n_{CCE}$ of the CCE in the PDCCH region are separately numbered. Even if $n_{CCE}$ and $n^{E\text{-}PDCCH}_{CCE}$ are equal, these numbers are shifted by $N_D$ as the UE-specific parameter. In this way, the duplication of the PUCCH resource is avoided without using complex scheduling. Since the CCE number is individually shifted by $N_D$ on each terminal device 102, this arrangement cuts down on the complexity of the PDCCH scheduling even if transmission through the PDCCH in the individual PDCCH region is performed in the same subframe to the multiple terminal devices 102.

Figure 16:
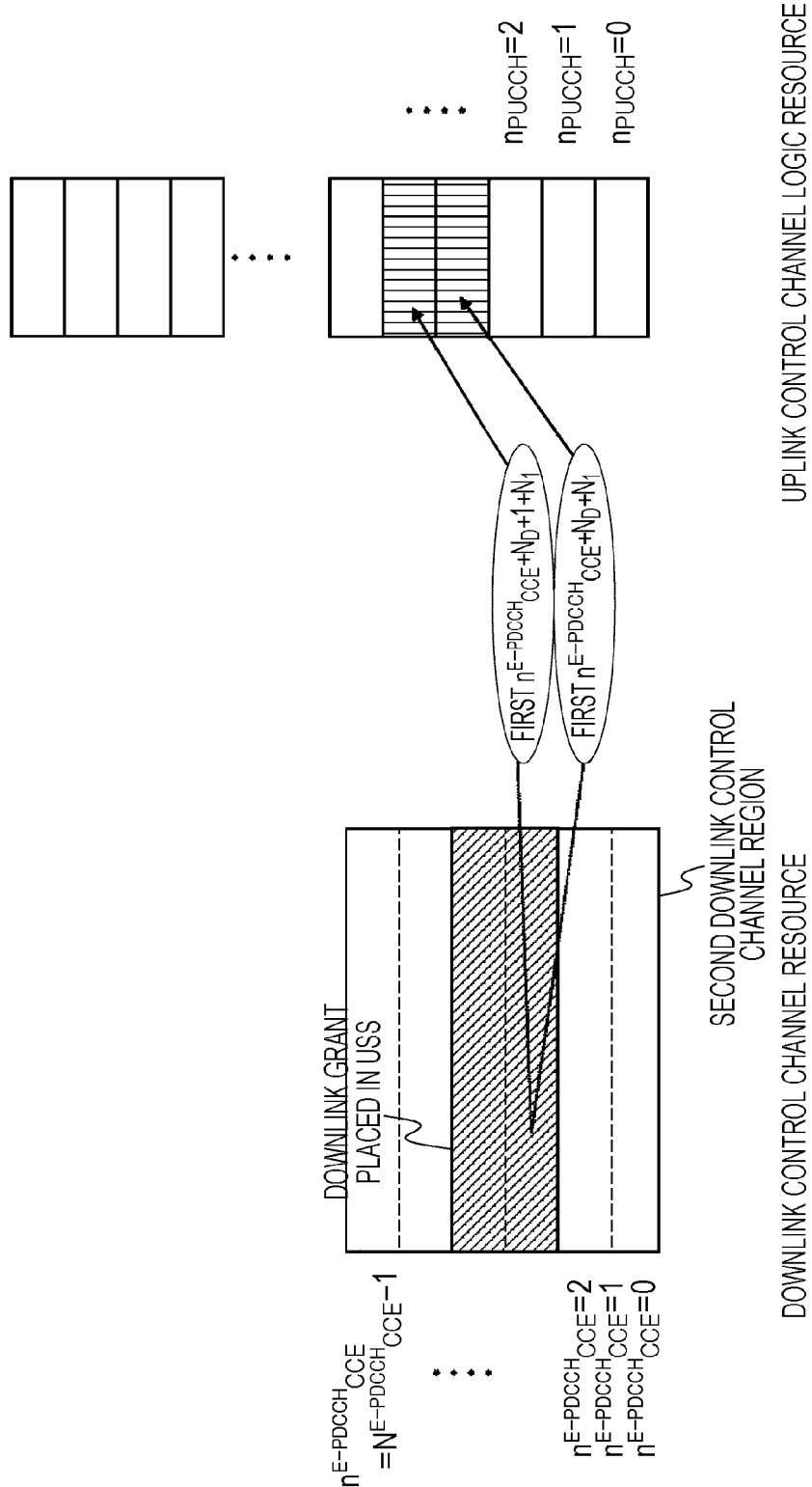
FIG. 16 illustrates another example of the downlink grant and the PUCCH resource allocation of the first embodiment.
Figure 23:
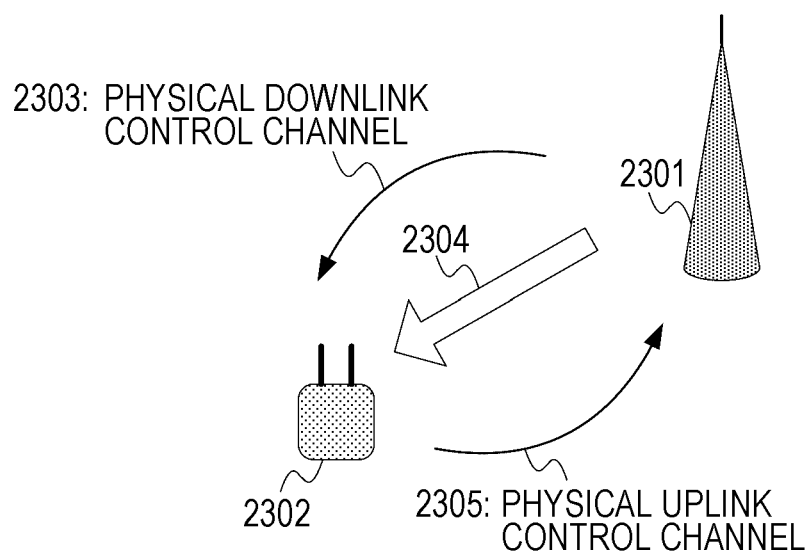
FIG. 23 illustrates a configuration example of a communication system.

FIG. 16 illustrates another example of the downlink grant and the PUCCH resource allocation. The downlink grant is placed in the USS in the E-PDCCH region. The structure of the CCEs in the E-PDCCH region and the CCE number allocation remain unchanged from those in FIG. 13.

The PUCCH resource that is determined by adding $N_D$ as a UE-specific parameter to the CCE number $n^{E\text{-}PDCCH}_{CCE}$ of the first CCE is used from among the CCEs forming the E-PDCCH including the downlink grant. More specifically, as illustrated in FIG. 16, the PUCCH resource having an index $n_{PUCCH}$ matching a value resulting from adding a UE-specific parameter $N_D$ and a cell-specific parameter $N_1$ to the CCE number $n^{E\text{-}PDCCH}_{CCE}$ of the first CCE, from among the CCEs forming the E-PDCCH including the downlink grant, is a PUCCH resource that is allocated to the HARQ response information of the downlink transmission data corresponding to the downlink grant. As described above, the CCE number $n^{E\text{-}PDCCH}_{CCE}$ of the CCE in the E-PDCCH region and the CCE number $n_{CCE}$ of the CCE in the PDCCH region are separately numbered. Even if $n_{CCE}$ and $n^{E\text{-}PDCCH}_{CCE}$ are equal, these numbers are shifted by $N_D$ as the UE-specific parameter. In this way, the duplication of the PUCCH resource is avoided without using complex scheduling. Since the CCE number is individually shifted by $N_D$ on each terminal device 102, this arrangement cuts down on the complexity of the E-PDCCH scheduling even if transmission through the E-PDCCH in the individual E-PDCCH regions is performed in the same subframe to the multiple terminal devices 102. In other words, if elements forming the E-PDCCH in the E-PDCCH region are re-numbered, the PUCCH resource responsive to a small CCE number is used. This arrangement cuts down on the contention of the PUCCH resources, reducing contention probability of the PUCCH resources. If multiple PUCCH resources are needed, PUCCH resources having one-by-one increasingly larger indexes may be employed.

As described above with reference to FIG. 15 and FIG. 16, the PUCCH resource having the index $n_{PUCCH}$ matching the value resulting from adding the UE-specific parameter $N_D$ and the cell-specific parameter $N_1$ to the CCE number $n_{CCE}$ or the CCE number $n^{E\text{-}PDCCH}_{CCE}$ of the first CCE is used in the CCEs forming the PDCCH or E-PDCCH. The present invention is not limited to this example. For example, the UE-specific parameter $N_D$ may be used in place of the cell-specific parameter $N_1$ as illustrated in FIG. 17.

In order to transmit the downlink transmission data related to the downlink grant in the CSS, the base station 101 allocates the downlink grant to a resource in the CSS corresponding to the uplink control channel resource which is used to report the HARQ response information responsive to the downlink transmission data. Preferably, the base station 101 adds a predetermined value to the index of the element having the minimum index forming the resources in the CSS. The PUCCH resource responsive to the resource of the downlink grant is the PUCCH resource having the index equal to the value as a result of summing. The base station 101 monitors the uplink control channel resource and extracts the HARQ response information.

Upon detecting the downlink grant in the CSS region, the terminal device 102 reports the HARQ response information responsive to the downlink transmission data related to the downlink grant using the PUCCH resource responsive to the E-PDCCH resource from which the downlink grant has been detected.

In other words, the base station 101 notifies the terminal device 102 of the PDCCH or E-PDCCH placed in the PDSCH region by placing the PDCCH or E-PDCCH in the CSS. The terminal device 102 monitors the PDCCH placed in the CSS in the PDCCH region and the E-PDCCH placed in the CSS in the E-PDCCH region. In a case that the downlink grant is detected, the terminal device 102 extracts the transmission data in the PDSCH related to the detected downlink grant, generates the response information related to the extracted transmission data, generates the PUCCH by mapping the response information to the PUCCH resource corresponding to the resource from which the downlink grant has been detected, and reports the generated PUCCH to the base station 101. The base station 101 extracts the PUCCH to which the response information responsive to the transmission data in the PDSCH related to the downlink grant is mapped, in the PUCCH resource corresponding to the resource having the downlink grant placed therein.

In this way, the uplink control channel is dynamically allocated to the terminal device in a case that the PDCCH or E-PDCCH placed in the CSS is transmitted and received. This allows the uplink control channel to be efficiently used. Since the CSS is not dependent on the UE-specific parameter, the PUCCH resource may be determined independently of the UE-specific parameter.

The base station 101 expressly notifies each terminal device 102 of the parameter that shifts the PUCCH resource from one terminal device 102 to another terminal device 102. The terminal device 102 determines the PUCCH resource in view of the notified parameter. Preferably, the terminal device 102 adds the parameter to the index of the element having the minimum index from among the elements forming the PDCCH resource or E-PDCCH resource placed in the USS.

In other words, the base station 101 notifies each terminal device 102 of the control information including the parameter indicating the individual shift amount individually configured on each terminal device 102. The terminal device 102 acquires the control information including the parameter indicating the individual shift amount, and generates the PUCCH by mapping the response information to the PUCCH resource determined by adding the individual shift amount to the index indicating the PDCCH or E-PDCCH resource placed in the USS. The base station 101 extracts the PUCCH and acquires the response information in the PUCCH resource determined by adding the individual shift amount to the index indicating the PDCCH or E-PDCCH resource placed in the USS.

In this way, the duplication of the uplink control channel among the terminal devices is easily avoided in the dynamic allocation of the uplink control channel to the terminal device 102 in a case that the base station 101 and the terminal device 102 transmit or receive the downlink grant using the E-PDCCH. For this reason, the E-PDCCH or PDCCH may be efficiently used.

A switching operation as to whether to use the individual shift amount is used or not is performed in the determination of the PUCCH resource. This switching operation is performed, depending on whether the PDCCH or E-PDCCH as the downlink grant is placed in the CSS or USS. In this way, the PUCCH resource that is free from the effect of the UE-specific parameter or the PUCCH resource that is configurable in a UE-specific manner is used in a case-by-case fashion without introducing new signaling.

Coordinated communication may be performed at multiple transmission and reception points in a heterogeneous network that includes a base station having a smaller cell radius in addition to a large cell. In such a case, interference may be adjusted (coordinated) using the individual shift amount. More specifically, the communication system may perform, in a case-by-case fashion without introducing new signaling, transmission and reception in which interference is coordinated at the multiple transmission and reception points or transmission and reception of the related art in which no individual shift amount is used.

Second Embodiment

In the first embodiment described above, the shift (offset) value of the PUCCH resource is expressly signaled. In a second embodiment of the present invention, the shift (offset) value of the PUCCH resource is implicitly/suggestively signaled. A communication system of the second embodiment may be identical in structure to the communication system of FIG. 1. The block configurations of base station 101 and the terminal device 102 of the second embodiment are identical to the block configurations illustrated in FIG. 4 and FIG. 5.

FIG. 18 illustrates a downlink data transmission and the flow of a response procedure between the base station 101 and the terminal device 102. The base station 101 broadcasts the cell-specific parameter $N_1$ using a broadcasting channel, and the terminal device 102 acquires the broadcast information (step S1801). In this example here, the base station 101 broadcasts $N_1$, but the present invention is not limited to this method. For example, a similar effect results if the base station 101 notifies each terminal device of $N_1$ using individual signaling (RRC signaling).

The base station 101 then notifies the terminal device 102 of the control information specifying the E-PDCCH region using the RRC signaling, and the terminal device 102 configures the E-PDCCH region in accordance with the control information (step S1802).

The base station 101 transmits to the terminal device the downlink grant and the downlink transmission data responsive to the downlink grant using the PDCCH or E-PDCCH, and the terminal device 102 receives the downlink grant and the downlink transmission data (step S1803).

Each terminal device 102 determines $N_D$ in accordance with a predetermined method based on information configured on the terminal device 102 on a per terminal device basis (step S1804).

Finally, the terminal device 102 determines the PUCCH resource, based on $N_1$ acquired in step S2101, configuration information of the E-PDCCH region acquired in step S1802, information of the resource of the downlink grant detected in step S1803, and $N_D$ determined in step S1804. The terminal device 102 reports the HARQ response information using the determined PUCCH resource (step S1805).

The determination method of $N_D$ in step S1804 may be one of the following methods.

(1) The SS configuration for monitoring the downlink grant in step S1803 is determined first. For example, the value of $N_D$ is configured to be A (predetermined value) if the downlink grant is detected in the USS of the first slot, and $N_D$ is configured to be B (predetermined value) different from A if the downlink grant is detected in the USS of the second slot. If the E-PDCCH as the downlink grant is MIMO-multiplexed, $N_D$ to be used corresponds to a layer (transmission port) to which the E-PDCCH is allocated.

(2) The $N_D$ is determined from other configuration information to be configured in a UE-specific manner. For example, $N_D$ is calculated using ID allocated to the terminal device. For example, $N_D$ may be calculated using the ID and $N_{CCE}$ allocated to the terminal device or using the cell-specific parameter specified by the base station, or may be calculated using a remainder calculation operation on the ID.

Alternatively, $N_D$ may be calculated using a value associated in advance with the transmission port used to transmit the downlink data or a value associated in advance with a scrambling code ID.

As described above, the base station 101 implicitly/suggestively notifies each terminal device 102 the parameter for shifting the PUCCH resource on each terminal device 102. The terminal device 102 determines the PUCCH resource in view of the notified parameter. Preferably, the terminal device 102 adds the parameter to the index of the element having the minimum index from among the elements forming the PDCCH or E-PDCCH resource placed in the USS.

The duplication of the uplink control channel among the terminal devices is easily avoided in the dynamic allocation of the uplink control channel to the terminal device 102 in a case that the base station 101 and the terminal device 102 transmit or receive the downlink grant using the PDCCH or E-PDCCH placed in the USS. For this reason, the E-PDCCH or PDCCH may be efficiently used.

Third Embodiment

In the first embodiment described above, the shift (offset) value of the PUCCH resource is quasi-statically signaled. In a third embodiment described below, the shift (offset) value of the PUCCH resource is dynamically signaled. A communication system of the third embodiment may be identical in structure to the communication system of FIG. 1. The block configurations of base station 101 and the terminal device 102 of the second embodiment are identical to the block configurations illustrated in FIG. 4 and FIG. 5.

FIG. 19 illustrates a downlink data transmission and the flow of a response procedure between the base station 101 and the terminal device 102. The base station 101 broadcasts the cell-specific parameter $N_1$ using a broadcasting channel, and the terminal device 102 acquires the broadcast information (step S1901). In this example here, the base station 101 broadcasts $N_1$, but the present invention is not limited to this method. For example, a similar effect results if the base station 101 notifies each terminal device 102 of $N_1$ using individual signaling (RRC signaling).

The base station 101 then notifies the terminal device 102 of the control information specifying the E-PDCCH region using the RRC signaling, and the terminal device 102 configures the E-PDCCH region in accordance with the control information (step S1902).

The base station 101 notifies the terminal device 102 of the control information specifying multiple types of $N_D$ values using the RRC signaling, and the terminal device 102 configures the multiple types of $N_D$ values in accordance with the control information (step S1903).

The base station 101 transmits to the terminal device 102 the downlink grant and the downlink transmission data responsive to the downlink grant using the PDCCH or E-PDCCH, and the terminal device 102 receives the downlink grant and the downlink transmission data (step S1904). The downlink grant includes information which $N_D$ to specify from among the multiple types of $N_D$.

Finally, the terminal device 102 determines the PUCCH resource, based on $N_1$ acquired in step S1901, configuration information of the E-PDCCH region acquired in step S1902, information of the resource of the downlink grant detected in step S1904, and $N_D$ specified in step S1903 and step S1904. The terminal device 102 reports the HARQ response information using the determined PUCCH resource (step S1905).

In the configuration method of the multiple types of $N_D$ in step S1903, the number of $N_D$ is pre-configured, and the value of $N_D$ responsive to each index is notified as illustrated in FIG. 20. Referring to FIG. 20, four types of $N_D$ are used, and the values A, B, C, and D corresponding thereto are notified. The downlink grant of step S1904 includes an information field specifying the index indicating $N_D$. By extracting the information field, $N_D$ is determined. Since the downlink grant having the information field specifying the index indicating $N_D$ is placed in the USS rather than the CSS, the effect on the other terminal device is minimized. All the types do not necessarily have to be configured in step S1903. For example, some of the multiple types may be configured to be a fixed value (such as zero).

As described above, the base station 101 dynamically specifies the parameter that shifts the PUCCH resource from one terminal device 102 to another terminal device 102, and the terminal device 102 determines the PUCCH resource in view of the specified parameter. Preferably, the parameter is added to the index of the element having the minimum index from among the elements forming the E-PDCCH resource.

The duplication of the uplink control channel among the terminal devices 102 is easily avoided in the dynamic allocation of the uplink control channel to the terminal device 102 in a case that the base station 101 and the terminal device 102 transmit or receive the downlink grant using the E-PDCCH placed in the USS. For this reason, the E-PDCCH or PDCCH may be efficiently used.

As described above, $N_D$ is notified quasi-statically and expressly in the first embodiment, $N_D$ is notified implicitly/suggestively in the second embodiment, and $N_D$ is dynamically and expressly notified in the third embodiment. These methods may be combined in use. For example, a formula that determines $N_D$ may be defined, and as an element (term), a parameter that is notified quasi-statically and expressly or a parameter that is notified implicitly/suggestively or a parameter that is notified dynamically and expressly may be introduced. By adding multiple $N_D$ to the index of the E-PDCCH resource, the PUCCH resource may be determined.

Fourth Embodiment

In the above-described embodiments, the shift (offset) value of the PUCCH resource is used. In a fourth embodiment described below, a single PUCCH resource is dynamically specified from among PUCCH resource candidates in a case that the PDCCH or E-PDCCH is transmitted or received in the USS. A communication system of the fourth embodiment may be identical to structure to the communication system of FIG. 1. The block configurations of base station 101 and the terminal device 102 of the fourth embodiment are identical to the block configurations illustrated in FIG. 4 and FIG. 5.

FIG. 21 illustrates a downlink data transmission and the flow of a response procedure between the base station 101 and the terminal device 102. The base station 101 broadcasts the cell-specific parameter $N_1$ using a broadcasting channel, and the terminal device 102 acquires the broadcast information (step S2101). In this example here, the base station 101 broadcasts $N_1$, but the present invention is not limited to this method. For example, a similar effect results if the base station 101 notifies each terminal device 102 of $N_1$ using individual signaling (RRC signaling).

Using the RRC signaling, the base station 101 then notifies the terminal device 102 of the control information specifying the E-PDCCH region, and the terminal device 102 configures the E-PDCCH region in accordance with the control information (step S2102).

The base station 101 notifies the terminal device 102 of the control information specifying multiple types of $N_D$ values using the RRC signaling, and the terminal device 102 configures multiple PUCCH resource candidates for the values of multiple types (the PUCCH resource indexes) based on the control information (step S2103).

The base station 101 transmits to the terminal device 102 the downlink grant and the downlink transmission data responsive to the downlink grant using the PDCCH or E-PDCCH, and the terminal device 102 receives the downlink grant and the downlink transmission data (step S2104). The downlink grant includes information specifying which PUCCH resource to use from among the multiple candidates.

Finally, upon detecting the PDCCH or E-PDCCH in the CSS, the terminal device 102 determines the PUCCH resource, based on $N_1$ acquired in step S2101, and the index of the detected PDCCH or E-PDCCH. Upon detecting the PDCCH or E-PDCCH in the USS, the terminal device 102 determines the PUCCH resource, based on information of the resource of the downlink grant detected in step S2104, and the candidate specified in step S2103 and step S2104, and reports the HARQ response information using the determined PUCCH resource (step S2105). The base station receives the HARQ response information in the PUCCH resource different depending on whether the PDCCH or E-PDCCH is transmitted in the CSS or in the USS.

In the configuration method of the multiple type candidates in step S2103, the number of the PUCCH resource type candidates is determined in advance as illustrated in FIG. 22. The value of the candidate for each index is notified. Referring to FIG. 22, four types of the PUCCH resource type candidates are used, and the values A, B, C, and D corresponding thereto are notified. The downlink grant of step S2104 includes an information field specifying the index indicating the PUCCH resource. By extracting the information field, the PUCCH resource is determined. Since the downlink grant having the information field specifying the index indicating $N_D$ is placed in the USS rather than the CSS, the effect on the other terminal device is minimized. All the types do not necessarily have to be configured in step S2103. For example, some of the multiple types may be configured to be a fixed value (such as zero). In some of the multiple types, as in the same manner in the CSS, the PUCCH resource may be calculated from the index of the PDCCH or E-PDCCH resource.

In the above discussion, two or more candidates are configured in step S2103, and one PUCCH resource is specified from among the candidates in step S2104. Alternatively, a single PUCCH resource may be configured in step S2103. In such a case, the downlink grant in step S2104 is free from including the information field specifying the index indicating the PUCCH resource, but the remaining operation may be identical to the operation described above.

As described above, the base station 101 dynamically specifies the PUCCH resource on each terminal device 102, and the terminal device 102 determines the PUCCH resource in view of the specified parameter.

The duplication of the uplink control channel among the terminal devices 102 is easily avoided in the dynamic allocation of the uplink control channel to the terminal device 102 in a case that the base station 101 and the terminal device 102 transmit or receive the downlink grant using the E-PDCCH. For this reason, the E-PDCCH or PDCCH may be efficiently used.

The PUCCH resources to be used for transmission are switched depending on whether the terminal device has detected the PDCCH or E-PDCCH in the CSS or the USS. Also, the PUCCH resources to be received are switched depending on whether the base station has transmitted the PDCCH or E-PDCCH placed in the CSS or the USS. The advantageous effect close to that of each of the above-described embodiments may be achieved even if the switching is performed in response to a DCI format instead of the SS. More specifically, the PUCCH resources to be used for transmission are switched depending on whether the terminal device has detected the DCI format transmittable in the CSS or the DCI format transmittable only in the USS as the PDCCH or E-PDCCH. Also, the PUCCH resources to be received are switched depending on whether the base station transmits the DCI format transmittable in the CSS or the DCI format transmittable only in the USS as the PDCCH or E-PDCCH.

In each of the above-described embodiments, the resource element or the resource block is used as the mapping unit of the data channel, the control channel, the PDSCH, the PDCCH, or the reference signal, and the subframe or the radio frame is used as the transmission unit in the time domain. The present invention is not limited to these units. The same advantageous effect may be achieved if a region having any frequency band and time band and a time unit are used instead of these units.

In each of the above-described embodiments, the physical downlink control channel 103 that is extended in the PDSCH region is referred to as E-PDCCH to clarify the difference from the related-art physical downlink control channel (PDCCH). The present invention is not limited to this configuration. The operation of the physical downlink control channel extended in the PDSCH region may be different from the operation of the related-art physical downlink control channel placed in the PDCCH. Even if both physical downlink control channels are referred to as PDCCH, the configuration is substantially identical to each of the above-described embodiments where the E-PDCCH is discriminated from the PDCCH.

In a case that the terminal device starts communicating with the base station, the terminal device notifies the base station of information indicating whether the terminal device is enabled to use the functions of the embodiments (terminal device performance information, or function group information), and the base station thus determines whether the functions of the embodiments are available. More specifically, if the functions of the embodiments are available, the terminal device may include, in the terminal device performance, information indicating that the functions of the embodiments are available for the terminal device. If the functions of the embodiments are not available, the terminal device may not include, in the terminal device performance, information indicating that the functions of the embodiments are available for the terminal device. Alternatively, if the functions of the embodiments are available, the terminal device makes a bit 1 in a predetermined bit field in the function group information. If the functions of the embodiments are not available, the terminal device makes a bit 0 in the predetermined bit field in the function group information.

A program running on the base station and the terminal device of the present invention is a program that controls a CPU (a program for causing a computer to function) in a manner such that the functions of the embodiments of the present invention are implemented. Information handled by the devices may be temporarily stored on a RAM during process, and then stored on a variety of ROMs or HDD. The information may be read, corrected, or written by the CPU as necessary. Recording media storing the program may include semiconductor memories (such as a ROM or a non-volatile memory card), optical recording media (such as DVD, MO, MD, CD, or BD), and magnetic recording media (such as a magnetic tape or a flexible disk). The functions of the embodiments are implemented by executing the loaded program. The functions of the invention may also be implemented in conjunction with an operating system or another application program in response to an instruction of the program.

To circulate the program in the market, the program may be supplied in a stored state on a portable recording medium, or is transferred to a server computer via a network such as the Internet. In such a case, a storage device in the server computer also falls within the scope of the present invention. Whole or part of the base station and the terminal device may be implemented as LSI as a typical integrated circuit. Each function block in the base station and the terminal device may be individually integrated into a chip. Alternatively, all or some of the function blocks may be integrated into a chip. The integrated form may not be limited to LSI. The integrated form may be a dedicated circuit, or a general-purpose processor. If a technique of circuit integration replacing the LSI appears with the advance of semiconductor technique, an integrated circuit resulting from the technique may also be used.

The embodiments of the present invention have been described in detail with reference to the drawings. A specific structure of each embodiment is not limited to the structures described above. A variety of design changes is possible without departing from the scope of the present invention. A variety of modification is possible without departing from the scope of the prevent invention defined by the claims. An embodiment resulting from combining technical means disclosed in the different embodiments may also fall within the scope of the present invention. The embodiments include elements that may have similar functions, and if an embodiment is constructed by interchanging the elements having the similar functions, such an embodiment may also fall within the scope of the present invention.

INDUSTRIAL APPLICABILITY

The present invention finds applications in a radio base station apparatus, a radio terminal device, a radio communication system, and a radio communication method.

REFERENCE SIGNS LIST

101 Base station
102 Terminal device
103 Enhanced physical downlink control channel
104 Downlink transmission data
105 Physical uplink control channel
401 Codeword generating unit
402 Downlink subframe generating unit
403 Physical downlink control channel generating unit
404 OFDM signal transmitting unit
405 and 511 Transmit antennas
406 and 501 Receive antennas
407 SC-FDMA signal receiving unit
408 Uplink subframe processing unit
409 Physical uplink control channel extracting unit
410 and 506 Higher layers
502 OFDM signal receiving unit
503 Downlink subframe processing unit
504 Physical downlink control channel extracting unit
505 Codeword extracting unit
507 Response information generating unit
508 Uplink subframe generating unit
509 Physical uplink control channel generating unit
510 SC-FDMA signal transmitting unit
2301 Base station
2302 Terminal device
2303 Physical downlink control channel
2304 Downlink transmission data
2305 Physical uplink control channel

The invention claimed is:

1. A terminal device in communication with a base station, comprising:
   downlink control channel detecting circuitry that monitors a physical downlink control channel placed in a common search space and an enhanced physical downlink control channel placed in a terminal-specific search space,
   data extracting circuitry that extracts transmission data from a physical downlink shared channel related to the detected physical downlink control channel or the detected enhanced physical downlink control channel,
   response information generating circuitry that generates response information responsive to the extracted transmission data,
   uplink control channel generating circuitry that, in a case that the downlink control channel detecting circuitry detects the enhanced physical downlink control channel, generates a physical uplink control channel by mapping the response information to a physical uplink control channel resource determined by adding at least an individual shift amount individually configured on a per terminal device basis to an index of an element, the detected enhanced physical downlink control channel including at least the element, and
   response transmitting circuitry that transmits a signal including the physical uplink control channel.

2. The terminal device according to claim 1, further comprising higher layer control information acquisition circuitry that acquires control information including a parameter indicating the individual shift amount.

3. The terminal device according to claim 2, wherein the higher layer control information acquisition circuitry acquires the control information including a parameter indicating a common shift amount commonly configured on terminal devices,
   wherein in a case that the downlink control channel detecting circuitry has detected the physical downlink control channel, the uplink control channel generating circuitry generates the physical uplink control channel by mapping the response information to the physical uplink control channel resource having as an index a value resulting from adding at least the common shift amount to the index of the element forming the detected physical downlink control channel, and
   in a case that the downlink control channel detecting circuitry has detected the enhanced physical downlink control channel, the uplink control channel generating circuitry generates the physical uplink control channel by mapping the response information to the physical uplink control channel resource having as an index a value resulting from adding at least the individual shift amount to the index of the element forming the detected enhanced physical downlink control channel.

4. The terminal device according to claim 1, wherein the uplink control channel generating circuitry generates the physical uplink control channel by mapping the response information to the physical uplink control channel resource determined in response to at least the index of the element forming the detected enhanced physical downlink control channel and the individual shift amount configured on a transmission port with the enhanced physical downlink control channel detected therefrom.

5. The terminal device according to claim 1, wherein upon detecting the enhanced physical downlink control channel, the downlink control channel detecting circuitry extracts a single individual shift amount specified by the detected enhanced physical downlink control channel from among a plurality of types of individual shift amounts, and wherein in a case that the downlink control channel detecting circuitry has detected the enhanced physical downlink control channel, the uplink control channel generating circuitry generates the physical uplink control channel by mapping the response information to the physical uplink control channel resource determined by adding at least the extracted individual shift amount to the index of the element forming the enhanced physical downlink control channel.

6. A base station in communication with a terminal device, comprising:

physical control information notifying circuitry that notifies the terminal device of a physical downlink control channel placed in a common search space or an enhanced physical downlink control channel placed in a terminal-specific search space, and response information receiving circuitry that, in a case that the physical control information notifying circuitry notifies the terminal device of the enhanced physical downlink control channel, extracts response information responsive to transmission data in a physical downlink shared channel related to the enhanced physical downlink control channel, in a physical uplink control channel resource determined by adding at least an individual shift amount individually configured on a per terminal device basis to an index of an element, the enhanced physical downlink control channel including at least the element.

7. The base station according to claim 6 further comprising higher layer control information notifying circuitry that notifies the terminal device of control information including a parameter indicating the individual shift amount.

8. The base station according to claim 7, wherein the higher layer control information notifying circuitry notifies the terminal device of the control information including a parameter indicating a common shift amount commonly configured in terminal devices, and wherein in a case that the physical control information notifying circuitry notifies the terminal device of the physical downlink control channel, the response information receiving circuitry extracts the physical uplink control channel in the physical uplink control channel resource having as an index a value resulting from adding at least the common shift amount to the index of the element forming the physical downlink control channel, and in a case that the physical control information notifying circuitry notifies the terminal device of the enhanced physical downlink control channel, the response information receiving circuitry extracts the physical uplink control channel in the physical uplink control channel resource having as an index a value resulting from adding at least the individual shift amount to the index of the element forming the enhanced physical downlink control channel.

9. The base station according to claim 6, wherein the response information receiving circuitry extracts the physical uplink control channel in the physical uplink control channel resource determined in response to at least the index of the element forming the enhanced physical downlink control channel and the individual shift amount configured on a transmission port with the enhanced physical downlink control channel detected therefrom.

10. The base station according to claim 6, wherein the physical control information notifying circuitry notifies the terminal device of the detected enhanced physical downlink control channel specifying a single individual shift amount from among a plurality of types of individual shift amounts, and wherein the response information receiving circuitry extracts the physical uplink control channel in the physical uplink control channel resource determined by adding at least the specified individual shift amount to the index of the element forming the physical downlink control channel.

11. A communication method of a terminal device in communication with a base station, the communication method comprising:

monitoring a physical downlink control channel placed in a common search space and an enhanced physical downlink control channel placed in a terminal-specific search space, extracting transmission data from a physical downlink shared channel related to the detected physical downlink control channel or the detected enhanced physical downlink control channel, generating response information responsive to the extracted transmission data, generating a physical uplink control channel, with the enhanced physical downlink control channel detected, by mapping the response information to a physical uplink control channel resource determined by adding at least an individual shift amount individually configured on a per terminal device basis to an index of an element, the detected enhanced physical downlink control channel including at least the element, and transmitting a signal including the physical uplink control channel.

12. A communication method of a base station in communication with a terminal device, the communication method comprising:

notifying the terminal device of a physical downlink control channel placed in a common search space or an enhanced physical downlink control channel placed in a terminal-specific search space, and extracting response information responsive to transmission data in a physical downlink shared channel related to the enhanced physical downlink control channel, with the enhanced physical downlink control channel notified, in a physical uplink control channel resource determined by adding at least an individual shift amount individually configured on a per terminal device basis to an index of an element, the enhanced physical downlink control channel including at least the element.

* * * * *